(12) United States Patent
Weir et al.

(10) Patent No.: US 10,965,862 B2
(45) Date of Patent: Mar. 30, 2021

(54) MULTI-CAMERA NAVIGATION INTERFACE

(71) Applicant: Google LLC, Mountain View, CA (US)

(72) Inventors: Mark Weir, San Francisco, CA (US); Grant Yoshida, Sunnyvale, CA (US)

(73) Assignee: GOOGLE LLC, Mountain View, TX (US)

( * ) Notice: Subject to any disclaimer, the term of this patent is extended or adjusted under 35 U.S.C. 154(b) by 269 days.

(21) Appl. No.: 15/874,723

(22) Filed: Jan. 18, 2018

(65) Prior Publication Data

US 2019/0222748 A1 Jul. 18, 2019

(51) Int. Cl.
*H04N 5/232* (2006.01)
*G06F 3/0488* (2013.01)
(Continued)

(52) U.S. Cl.
CPC ....... *H04N 5/23216* (2013.01); *G06F 3/0482* (2013.01); *G06F 3/0488* (2013.01); *G06F 3/04817* (2013.01); *G06F 3/04842* (2013.01); *H04N 5/23238* (2013.01); *H04N 5/23293* (2013.01); *H04N 5/23296* (2013.01); *H04N 5/247* (2013.01); *H04N 5/265* (2013.01); *H04N 13/117* (2018.05); *G08B 13/19641* (2013.01); *G08B 13/19682* (2013.01); *H04N 5/22541* (2018.08)

(58) Field of Classification Search
CPC ...... H04N 5/23216; H04N 5/23; H04N 5/247; H04N 5/265; H04N 13/117; G06F 3/048; G08B 13/19
See application file for complete search history.

(56) References Cited

U.S. PATENT DOCUMENTS

| 725,567 A | 4/1903 | Ives |
| 4,383,170 A | 5/1983 | Takagi et al. |

(Continued)

FOREIGN PATENT DOCUMENTS

| CN | 101226292 | 7/2008 |
| CN | 101309359 | 11/2008 |

(Continued)

OTHER PUBLICATIONS

International Search Report and Written Opinion dated Apr. 16, 2019 for corresponding International Application No. PCT/US2019/013645, 13 pages.

(Continued)

*Primary Examiner* — Roland J Casillas

(57) ABSTRACT

An interface is provided for navigating among views in a multi-camera environment. In addition to providing improved ease of use, such an interface also provides an overview of the scene represented by the captured video, by virtue of the positioning of various user interface elements representing different camera views. The navigation interface includes a number of selectable user interface elements, arranged in a fashion that approximates the physical positions of the cameras. Tapping or clicking on one of the elements causes a main window to display a current view from a corresponding camera or video feed. The navigation interface can be implemented, for example, in a live video capture system, or in a post-production system.

54 Claims, 19 Drawing Sheets

(51) Int. Cl.
*H04N 5/247* (2006.01)
*G06F 3/0484* (2013.01)
*G06F 3/0481* (2013.01)
*G06F 3/0482* (2013.01)
*H04N 13/117* (2018.01)
*H04N 5/265* (2006.01)
*G08B 13/196* (2006.01)
*H04N 5/225* (2006.01)

(56) References Cited

U.S. PATENT DOCUMENTS

| | | |
|---|---|---|
| 4,661,986 A | 4/1987 | Adelson |
| 4,694,185 A | 9/1987 | Weiss |
| 4,920,419 A | 4/1990 | Easterly |
| 5,076,687 A | 12/1991 | Adelson |
| 5,077,810 A | 12/1991 | D'Luna |
| 5,157,465 A | 10/1992 | Kronberg |
| 5,251,019 A | 10/1993 | Moorman et al. |
| 5,282,045 A | 1/1994 | Mimura et al. |
| 5,499,069 A | 3/1996 | Griffith |
| 5,572,034 A | 11/1996 | Karellas |
| 5,610,390 A | 3/1997 | Miyano |
| 5,729,471 A | 3/1998 | Jain et al. |
| 5,748,371 A | 5/1998 | Cathey, Jr. et al. |
| 5,757,423 A | 5/1998 | Tanaka et al. |
| 5,818,525 A | 10/1998 | Elabd |
| 5,835,267 A | 11/1998 | Mason et al. |
| 5,907,619 A | 5/1999 | Davis |
| 5,949,433 A | 9/1999 | Klotz |
| 5,974,215 A | 10/1999 | Bilbro et al. |
| 6,005,936 A | 12/1999 | Shimizu et al. |
| 6,021,241 A | 2/2000 | Bilbro et al. |
| 6,023,523 A | 2/2000 | Cohen et al. |
| 6,028,606 A | 2/2000 | Kolb et al. |
| 6,034,690 A | 3/2000 | Gallery et al. |
| 6,061,083 A | 5/2000 | Aritake et al. |
| 6,061,400 A | 5/2000 | Pearlstein et al. |
| 6,069,565 A | 5/2000 | Stern et al. |
| 6,075,889 A | 6/2000 | Hamilton, Jr. et al. |
| 6,084,979 A | 7/2000 | Kanade et al. |
| 6,091,860 A | 7/2000 | Dimitri |
| 6,097,394 A | 8/2000 | Levoy et al. |
| 6,115,556 A | 9/2000 | Reddington |
| 6,137,100 A | 10/2000 | Fossum et al. |
| 6,169,285 B1 | 1/2001 | Pertrillo et al. |
| 6,201,899 B1 | 3/2001 | Bergen |
| 6,221,687 B1 | 4/2001 | Abramovich |
| 6,320,979 B1 | 11/2001 | Melen |
| 6,424,351 B1 | 7/2002 | Bishop et al. |
| 6,448,544 B1 | 9/2002 | Stanton et al. |
| 6,466,207 B1 | 10/2002 | Gortler et al. |
| 6,476,805 B1 | 11/2002 | Shum et al. |
| 6,479,827 B1 | 11/2002 | Hamamoto et al. |
| 6,483,535 B1 | 11/2002 | Tamburrino et al. |
| 6,529,265 B1 | 3/2003 | Henningsen |
| 6,577,342 B1 | 6/2003 | Webster |
| 6,587,147 B1 | 7/2003 | Li |
| 6,597,859 B1 | 7/2003 | Leinhardt et al. |
| 6,606,099 B2 | 8/2003 | Yamada |
| 6,658,168 B1 | 12/2003 | Kim |
| 6,674,430 B1 | 1/2004 | Kaufman et al. |
| 6,687,419 B1 | 2/2004 | Atkin |
| 6,768,980 B1 | 7/2004 | Meyer et al. |
| 6,785,667 B2 | 8/2004 | Orbanes et al. |
| 6,833,865 B1 | 12/2004 | Fuller et al. |
| 6,842,297 B2 | 1/2005 | Dowski, Jr. et al. |
| 6,900,841 B1 | 5/2005 | Mihara |
| 6,924,841 B2 | 8/2005 | Jones |
| 6,927,922 B2 | 8/2005 | George et al. |
| 7,003,061 B2 | 2/2006 | Wiensky |
| 7,015,954 B1 | 3/2006 | Foote et al. |
| 7,025,515 B2 | 4/2006 | Woods |
| 7,034,866 B1 | 4/2006 | Colmenarez et al. |
| 7,079,698 B2 | 7/2006 | Kobayashi |
| 7,102,666 B2 | 9/2006 | Kanade et al. |
| 7,164,807 B2 | 1/2007 | Morton |
| 7,206,022 B2 | 4/2007 | Miller et al. |
| 7,239,345 B1 | 7/2007 | Rogina |
| 7,286,295 B1 | 10/2007 | Sweatt et al. |
| 7,304,670 B1 | 12/2007 | Hussey et al. |
| 7,329,856 B2 | 2/2008 | Ma et al. |
| 7,336,430 B2 | 2/2008 | George |
| 7,417,670 B1 | 8/2008 | Linzer et al. |
| 7,469,381 B2 | 12/2008 | Ording |
| 7,477,304 B2 | 1/2009 | Hu |
| 7,587,109 B1 | 9/2009 | Reininger |
| 7,620,309 B2 | 11/2009 | Georgiev |
| 7,623,726 B1 | 11/2009 | Georgiev |
| 7,633,513 B2 | 12/2009 | Kondo et al. |
| 7,683,951 B2 | 3/2010 | Aotsuka |
| 7,687,757 B1 | 3/2010 | Tseng et al. |
| 7,723,662 B2 | 5/2010 | Levoy et al. |
| 7,724,952 B2 | 5/2010 | Shum et al. |
| 7,748,022 B1 | 6/2010 | Frazier |
| 7,847,825 B2 | 12/2010 | Aoki et al. |
| 7,936,377 B2 | 5/2011 | Friedhoff et al. |
| 7,936,392 B2 | 5/2011 | Ng et al. |
| 7,941,634 B2 | 5/2011 | Georgi |
| 7,945,653 B2 | 5/2011 | Zuckerberg et al. |
| 7,949,252 B1 | 5/2011 | Georgiev |
| 7,982,776 B2 | 7/2011 | Dunki-Jacobs et al. |
| 8,013,904 B2 | 9/2011 | Tan et al. |
| 8,085,391 B2 | 12/2011 | MacHida et al. |
| 8,106,856 B2 | 1/2012 | Matas et al. |
| 8,115,814 B2 | 2/2012 | Iwase et al. |
| 8,155,456 B2 | 4/2012 | Babacan |
| 8,155,478 B2 | 4/2012 | Vitsnudel et al. |
| 8,189,089 B1 | 5/2012 | Georgiev et al. |
| 8,228,417 B1 | 7/2012 | Georgiev et al. |
| 8,248,515 B2 | 8/2012 | Ng et al. |
| 8,259,198 B2 | 9/2012 | Cote et al. |
| 8,264,546 B2 | 9/2012 | Witt |
| 8,279,325 B2 | 10/2012 | Pitts et al. |
| 8,289,440 B2 | 10/2012 | Knight et al. |
| 8,290,358 B1 | 10/2012 | Georgiev |
| 8,310,554 B2 | 11/2012 | Aggarwal et al. |
| 8,315,476 B1 | 11/2012 | Georgiev et al. |
| 8,345,144 B1 | 1/2013 | Georgiev et al. |
| 8,400,533 B1 | 3/2013 | Szedo |
| 8,400,555 B1 | 3/2013 | Georgiev et al. |
| 8,411,948 B2 | 4/2013 | Rother |
| 8,427,548 B2 | 4/2013 | Lim et al. |
| 8,442,397 B2 | 5/2013 | Kang et al. |
| 8,446,516 B2 | 5/2013 | Pitts et al. |
| 8,494,304 B2 | 7/2013 | Venable et al. |
| 8,531,581 B2 | 9/2013 | Shroff |
| 8,542,933 B2 | 9/2013 | Venkataraman et al. |
| 8,559,705 B2 | 10/2013 | Ng |
| 8,570,426 B2 | 10/2013 | Pitts et al. |
| 8,577,216 B2 | 11/2013 | Li et al. |
| 8,581,998 B2 | 11/2013 | Ohno |
| 8,589,374 B2 | 11/2013 | Chaudhri |
| 8,593,564 B2 | 11/2013 | Border et al. |
| 8,605,199 B2 | 12/2013 | Imai |
| 8,614,764 B2 | 12/2013 | Pitts et al. |
| 8,619,082 B1 | 12/2013 | Ciurea et al. |
| 8,629,930 B2 | 1/2014 | Brueckner et al. |
| 8,665,440 B1 | 3/2014 | Kompaniets et al. |
| 8,675,073 B2 | 3/2014 | Aagaard et al. |
| 8,724,014 B2 | 5/2014 | Ng et al. |
| 8,736,710 B2 | 5/2014 | Spielberg |
| 8,736,751 B2 | 5/2014 | Yun |
| 8,749,620 B1 | 6/2014 | Pitts et al. |
| 8,750,509 B2 | 6/2014 | Renkis |
| 8,754,829 B2 | 6/2014 | Lapstun |
| 8,760,566 B2 | 6/2014 | Pitts et al. |
| 8,768,102 B1 | 7/2014 | Ng et al. |
| 8,797,321 B1 | 8/2014 | Bertolami et al. |
| 8,811,769 B1 | 8/2014 | Pitts et al. |
| 8,831,377 B2 | 9/2014 | Pitts et al. |
| 8,848,970 B2 | 9/2014 | Aller et al. |
| 8,860,856 B2 | 10/2014 | Wetzstein et al. |
| 8,879,901 B2 | 11/2014 | Caldwell et al. |

(56) References Cited

U.S. PATENT DOCUMENTS

| | | |
|---|---|---|
| 8,903,232 B1 | 12/2014 | Caldwell |
| 8,908,058 B2 | 12/2014 | Akeley et al. |
| 8,948,545 B2 | 2/2015 | Akeley et al. |
| 8,953,882 B2 | 2/2015 | Lim et al. |
| 8,971,625 B2 | 3/2015 | Pitts et al. |
| 8,976,288 B2 | 3/2015 | Ng et al. |
| 8,988,317 B1 | 3/2015 | Liang et al. |
| 8,995,785 B2 | 3/2015 | Knight et al. |
| 8,997,021 B2 | 3/2015 | Liang et al. |
| 9,001,226 B1 | 4/2015 | Ng et al. |
| 9,013,611 B1 | 4/2015 | Szedo |
| 9,106,914 B2 | 8/2015 | Doser |
| 9,172,853 B2 | 10/2015 | Pitts et al. |
| 9,184,199 B2 | 11/2015 | Pitts et al. |
| 9,201,193 B1 | 12/2015 | Smith |
| 9,210,391 B1 | 12/2015 | Mills |
| 9,214,013 B2 | 12/2015 | Venkataraman et al. |
| 9,294,662 B2 | 3/2016 | Vondran, Jr. et al. |
| 9,300,932 B2 | 3/2016 | Knight et al. |
| 9,305,375 B2 | 4/2016 | Akeley |
| 9,305,956 B2 | 4/2016 | Pittes et al. |
| 9,386,288 B2 | 7/2016 | Akeley et al. |
| 9,392,153 B2 | 7/2016 | Myhre et al. |
| 9,419,049 B2 | 8/2016 | Pitts et al. |
| 9,467,607 B2 | 10/2016 | Ng et al. |
| 9,497,380 B1 | 11/2016 | Jannard et al. |
| 9,607,424 B2 | 3/2017 | Ng et al. |
| 9,628,684 B2 | 4/2017 | Liang et al. |
| 9,635,332 B2 | 4/2017 | Carroll et al. |
| 9,639,945 B2 | 5/2017 | Oberheu et al. |
| 9,647,150 B2 | 5/2017 | Blasco Claret |
| 9,681,069 B2 | 6/2017 | El-Ghoroury et al. |
| 9,774,800 B2 | 9/2017 | El-Ghoroury et al. |
| 9,858,649 B2 | 1/2018 | Liang et al. |
| 9,866,810 B2 | 1/2018 | Knight et al. |
| 9,900,510 B1 | 2/2018 | Karafin et al. |
| 9,979,909 B2 | 5/2018 | Kuang et al. |
| 2001/0048968 A1 | 12/2001 | Cox et al. |
| 2001/0053202 A1 | 12/2001 | Mazess et al. |
| 2002/0001395 A1 | 1/2002 | Davis et al. |
| 2002/0015048 A1 | 2/2002 | Nister |
| 2002/0061131 A1 | 5/2002 | Sawhney |
| 2002/0109783 A1 | 8/2002 | Hayashi et al. |
| 2002/0159030 A1 | 10/2002 | Frey et al. |
| 2002/0199106 A1 | 12/2002 | Hayashi |
| 2003/0043270 A1 | 3/2003 | Rafey |
| 2003/0081145 A1 | 5/2003 | Seaman et al. |
| 2003/0103670 A1 | 6/2003 | Schoelkopf et al. |
| 2003/0117511 A1 | 6/2003 | Belz et al. |
| 2003/0123700 A1 | 7/2003 | Wakao |
| 2003/0133018 A1 | 7/2003 | Ziemkowski |
| 2003/0147252 A1 | 8/2003 | Fioravanti |
| 2003/0156077 A1 | 8/2003 | Balogh |
| 2003/0184647 A1* | 10/2003 | Yonezawa ............ H04N 5/2351 348/143 |
| 2004/0002179 A1 | 1/2004 | Barton et al. |
| 2004/0012688 A1 | 1/2004 | Tinnerinno et al. |
| 2004/0012689 A1 | 1/2004 | Tinnerinno et al. |
| 2004/0101166 A1 | 5/2004 | Williams et al. |
| 2004/0114176 A1 | 6/2004 | Bodin et al. |
| 2004/0135780 A1 | 7/2004 | Nims |
| 2004/0189686 A1 | 9/2004 | Tanguay et al. |
| 2004/0257360 A1 | 12/2004 | Sieckmann |
| 2005/0031203 A1 | 2/2005 | Fukuda |
| 2005/0049500 A1 | 3/2005 | Babu et al. |
| 2005/0052543 A1 | 3/2005 | Li et al. |
| 2005/0080602 A1 | 4/2005 | Snyder et al. |
| 2005/0162540 A1 | 7/2005 | Yata |
| 2005/0212918 A1 | 9/2005 | Serra et al. |
| 2005/0225634 A1* | 10/2005 | Brunetti ............ G08B 13/19682 348/143 |
| 2005/0276441 A1 | 12/2005 | Debevec |
| 2006/0008265 A1 | 1/2006 | Ito |
| 2006/0023066 A1 | 2/2006 | Li et al. |
| 2006/0050170 A1 | 3/2006 | Tanaka |
| 2006/0056040 A1 | 3/2006 | Lan |
| 2006/0056604 A1 | 3/2006 | Sylthe et al. |
| 2006/0072175 A1 | 4/2006 | Oshino |
| 2006/0082879 A1 | 4/2006 | Miyoshi et al. |
| 2006/0130017 A1 | 6/2006 | Cohen et al. |
| 2006/0208259 A1 | 9/2006 | Jeon |
| 2006/0248348 A1 | 11/2006 | Wakao et al. |
| 2006/0250322 A1 | 11/2006 | Hall et al. |
| 2006/0256226 A1 | 11/2006 | Alon et al. |
| 2006/0274210 A1 | 12/2006 | Kim |
| 2006/0285741 A1 | 12/2006 | Subbarao |
| 2007/0008317 A1 | 1/2007 | Lundstrom |
| 2007/0019883 A1 | 1/2007 | Wong et al. |
| 2007/0030357 A1 | 2/2007 | Levien et al. |
| 2007/0033588 A1 | 2/2007 | Landsman |
| 2007/0052810 A1 | 3/2007 | Monroe |
| 2007/0071316 A1 | 3/2007 | Kubo |
| 2007/0081081 A1 | 4/2007 | Cheng |
| 2007/0097206 A1 | 5/2007 | Houvener |
| 2007/0103558 A1 | 5/2007 | Cai et al. |
| 2007/0113198 A1 | 5/2007 | Robertson et al. |
| 2007/0140676 A1 | 6/2007 | Nakahara |
| 2007/0188613 A1 | 8/2007 | Norbori et al. |
| 2007/0201853 A1 | 8/2007 | Petschnigg |
| 2007/0229653 A1 | 10/2007 | Matusik et al. |
| 2007/0230944 A1 | 10/2007 | Georgiev |
| 2007/0269108 A1 | 11/2007 | Steinberg et al. |
| 2007/0273795 A1 | 11/2007 | Jaynes |
| 2008/0007626 A1 | 1/2008 | Wernersson |
| 2008/0012988 A1 | 1/2008 | Baharav et al. |
| 2008/0018668 A1 | 1/2008 | Yamauchi |
| 2008/0031537 A1 | 2/2008 | Gutkowicz-Krusin et al. |
| 2008/0049113 A1 | 2/2008 | Hirai |
| 2008/0056569 A1 | 3/2008 | Williams et al. |
| 2008/0122940 A1 | 5/2008 | Mori |
| 2008/0129728 A1 | 6/2008 | Satoshi |
| 2008/0144952 A1 | 6/2008 | Chen et al. |
| 2008/0152215 A1 | 6/2008 | Rorie et al. |
| 2008/0158345 A1* | 7/2008 | Schklair ............ H04N 13/178 348/47 |
| 2008/0168404 A1 | 7/2008 | Ording |
| 2008/0180792 A1 | 7/2008 | Georgiev |
| 2008/0187305 A1 | 8/2008 | Raskar et al. |
| 2008/0193026 A1 | 8/2008 | Horie et al. |
| 2008/0205871 A1 | 8/2008 | Utagawa |
| 2008/0226274 A1 | 9/2008 | Spielberg |
| 2008/0232680 A1 | 9/2008 | Berestov et al. |
| 2008/0253652 A1 | 10/2008 | Gupta et al. |
| 2008/0260291 A1 | 10/2008 | Alakarhu et al. |
| 2008/0266688 A1 | 10/2008 | Errando Smet et al. |
| 2008/0277566 A1 | 11/2008 | Utagawa |
| 2008/0309813 A1 | 12/2008 | Watanabe |
| 2008/0316301 A1 | 12/2008 | Givon |
| 2009/0027542 A1 | 1/2009 | Yamamoto et al. |
| 2009/0041381 A1 | 2/2009 | Georgiev et al. |
| 2009/0041448 A1 | 2/2009 | Georgiev et al. |
| 2009/0070710 A1 | 3/2009 | Kagaya |
| 2009/0109280 A1 | 4/2009 | Gotsman |
| 2009/0128658 A1 | 5/2009 | Hayasaka et al. |
| 2009/0128669 A1 | 5/2009 | Ng et al. |
| 2009/0135258 A1 | 5/2009 | Nozaki |
| 2009/0140131 A1 | 6/2009 | Utagawa |
| 2009/0102956 A1 | 7/2009 | Georgiev |
| 2009/0185051 A1 | 7/2009 | Sano |
| 2009/0185801 A1 | 7/2009 | Georgiev et al. |
| 2009/0190022 A1 | 7/2009 | Ichimura |
| 2009/0190024 A1 | 7/2009 | Hayasaka et al. |
| 2009/0195689 A1 | 8/2009 | Hwang et al. |
| 2009/0202235 A1 | 8/2009 | Li et al. |
| 2009/0204813 A1 | 8/2009 | Kwan |
| 2009/0207233 A1 | 8/2009 | Mauchly et al. |
| 2009/0273843 A1 | 11/2009 | Raskar et al. |
| 2009/0295829 A1 | 12/2009 | Georgiev et al. |
| 2009/0309973 A1 | 12/2009 | Kogane |
| 2009/0309975 A1 | 12/2009 | Gordon |
| 2009/0310885 A1 | 12/2009 | Tamaru |
| 2009/0321861 A1 | 12/2009 | Oliver et al. |
| 2010/0003024 A1 | 1/2010 | Agrawal et al. |
| 2010/0021001 A1 | 1/2010 | Honsinger et al. |

(56) References Cited

U.S. PATENT DOCUMENTS

| | | |
|---|---|---|
| 2010/0026852 A1 | 2/2010 | Ng et al. |
| 2010/0050120 A1 | 2/2010 | Ohazama et al. |
| 2010/0060727 A1 | 3/2010 | Steinberg et al. |
| 2010/0097444 A1 | 4/2010 | Lablans |
| 2010/0103311 A1 | 4/2010 | Makii |
| 2010/0107068 A1 | 4/2010 | Butcher et al. |
| 2010/0111489 A1 | 5/2010 | Presler |
| 2010/0123784 A1 | 5/2010 | Ding et al. |
| 2010/0141780 A1 | 6/2010 | Tan et al. |
| 2010/0142839 A1 | 6/2010 | Lakus-Becker |
| 2010/0201789 A1 | 8/2010 | Yahagi |
| 2010/0253782 A1 | 10/2010 | Elazary |
| 2010/0265385 A1 | 10/2010 | Knight et al. |
| 2010/0277617 A1 | 11/2010 | Hollinger |
| 2010/0277629 A1 | 11/2010 | Tanaka |
| 2010/0303288 A1 | 12/2010 | Malone |
| 2010/0328485 A1 | 12/2010 | Imamura et al. |
| 2011/0001858 A1 | 1/2011 | Shintani |
| 2011/0018903 A1 | 1/2011 | Lapstun et al. |
| 2011/0019056 A1 | 1/2011 | Hirsch et al. |
| 2011/0025827 A1 | 2/2011 | Shpunt et al. |
| 2011/0032338 A1 | 2/2011 | Raveendran et al. |
| 2011/0050864 A1 | 3/2011 | Bond |
| 2011/0050909 A1 | 3/2011 | Ellenby |
| 2011/0069175 A1 | 3/2011 | Mistretta et al. |
| 2011/0075729 A1 | 3/2011 | Dane et al. |
| 2011/0090255 A1 | 4/2011 | Wilson et al. |
| 2011/0091192 A1 | 4/2011 | Iwane |
| 2011/0123183 A1 | 5/2011 | Adelsberger et al. |
| 2011/0129120 A1 | 6/2011 | Chan |
| 2011/0129165 A1 | 6/2011 | Lim et al. |
| 2011/0148764 A1 | 6/2011 | Gao |
| 2011/0149074 A1 | 6/2011 | Lee et al. |
| 2011/0169994 A1 | 7/2011 | DiFrancesco et al. |
| 2011/0205384 A1 | 8/2011 | Zamowski et al. |
| 2011/0221947 A1 | 9/2011 | Awazu |
| 2011/0242334 A1 | 10/2011 | Wilburn et al. |
| 2011/0242352 A1 | 10/2011 | Hikosaka |
| 2011/0249341 A1 | 10/2011 | DiFrancesco et al. |
| 2011/0261164 A1 | 10/2011 | Olesen et al. |
| 2011/0261205 A1 | 10/2011 | Sun |
| 2011/0267263 A1 | 11/2011 | Hinckley |
| 2011/0267348 A1 | 11/2011 | Lin |
| 2011/0273466 A1 | 11/2011 | Imai et al. |
| 2011/0279479 A1 | 11/2011 | Rodriguez |
| 2011/0133649 A1 | 12/2011 | Bales et al. |
| 2011/0292258 A1 | 12/2011 | Adler |
| 2011/0293179 A1 | 12/2011 | Dikmen |
| 2011/0298960 A1 | 12/2011 | Tan et al. |
| 2011/0304745 A1 | 12/2011 | Wang et al. |
| 2011/0311046 A1 | 12/2011 | Oka |
| 2011/0316968 A1 | 12/2011 | Taguchi et al. |
| 2012/0014837 A1 | 1/2012 | Fehr et al. |
| 2012/0050562 A1 | 3/2012 | Perwass et al. |
| 2012/0056889 A1 | 3/2012 | Carter et al. |
| 2012/0057040 A1 | 3/2012 | Park et al. |
| 2012/0057806 A1 | 3/2012 | Backlund et al. |
| 2012/0062755 A1 | 3/2012 | Takahashi et al. |
| 2012/0132803 A1 | 5/2012 | Hirato et al. |
| 2012/0133746 A1 | 5/2012 | Bigioi et al. |
| 2012/0147205 A1 | 6/2012 | Lelescu et al. |
| 2012/0176481 A1 | 7/2012 | Lukk et al. |
| 2012/0188344 A1 | 7/2012 | Imai |
| 2012/0201475 A1 | 8/2012 | Carmel et al. |
| 2012/0206574 A1 | 8/2012 | Shikata et al. |
| 2012/0218463 A1 | 8/2012 | Benezra et al. |
| 2012/0224787 A1 | 9/2012 | Imai |
| 2012/0229691 A1 | 9/2012 | Hiasa et al. |
| 2012/0249529 A1 | 10/2012 | Matsumoto et al. |
| 2012/0249550 A1 | 10/2012 | Akeley |
| 2012/0249819 A1 | 10/2012 | Imai |
| 2012/0251131 A1 | 10/2012 | Henderson et al. |
| 2012/0257065 A1 | 10/2012 | Velarde et al. |
| 2012/0257795 A1 | 10/2012 | Kim et al. |
| 2012/0271115 A1 | 10/2012 | Buerk |
| 2012/0272271 A1 | 10/2012 | Nishizawa et al. |
| 2012/0287246 A1 | 11/2012 | Katayama |
| 2012/0287296 A1 | 11/2012 | Fukui |
| 2012/0287329 A1 | 11/2012 | Yahata |
| 2012/0293075 A1 | 11/2012 | Engelen et al. |
| 2012/0300091 A1 | 11/2012 | Shroff et al. |
| 2012/0237222 A9 | 12/2012 | Ng et al. |
| 2013/0002902 A1 | 1/2013 | Ito |
| 2013/0002936 A1 | 1/2013 | Hirama et al. |
| 2013/0021486 A1 | 1/2013 | Richardson |
| 2013/0038696 A1 | 2/2013 | Ding et al. |
| 2013/0041215 A1 | 2/2013 | McDowall |
| 2013/0044290 A1 | 2/2013 | Kawamura |
| 2013/0050546 A1 | 2/2013 | Kano |
| 2013/0064453 A1 | 3/2013 | Nagasaka et al. |
| 2013/0064532 A1 | 3/2013 | Caldwell et al. |
| 2013/0070059 A1 | 3/2013 | Kushida |
| 2013/0070060 A1 | 3/2013 | Chatterjee et al. |
| 2013/0077880 A1 | 3/2013 | Venkataraman et al. |
| 2013/0082905 A1 | 4/2013 | Ranieri et al. |
| 2013/0088616 A1 | 4/2013 | Ingrassia, Jr. |
| 2013/0093844 A1 | 4/2013 | Shuto |
| 2013/0093859 A1 | 4/2013 | Nakamura |
| 2013/0094101 A1 | 4/2013 | Oguchi |
| 2013/0107085 A1 | 5/2013 | Ng et al. |
| 2013/0113981 A1 | 5/2013 | Knight et al. |
| 2013/0120356 A1 | 5/2013 | Georgiev et al. |
| 2013/0120605 A1 | 5/2013 | Georgiev et al. |
| 2013/0120636 A1 | 5/2013 | Baer |
| 2013/0121577 A1 | 5/2013 | Wang |
| 2013/0127901 A1 | 5/2013 | Georgiev et al. |
| 2013/0128052 A1 | 5/2013 | Catrein et al. |
| 2013/0128081 A1 | 5/2013 | Georgiev et al. |
| 2013/0128087 A1 | 5/2013 | Georgiev et al. |
| 2013/0129213 A1 | 5/2013 | Shectman |
| 2013/0135448 A1 | 5/2013 | Nagumo et al. |
| 2013/0176481 A1 | 7/2013 | Holmes et al. |
| 2013/0188068 A1 | 7/2013 | Said |
| 2013/0215108 A1 | 8/2013 | McMahon et al. |
| 2013/0215226 A1 | 8/2013 | Chauvier et al. |
| 2013/0222656 A1 | 8/2013 | Kaneko |
| 2013/0234935 A1 | 9/2013 | Griffith |
| 2013/0242137 A1 | 9/2013 | Kirkland |
| 2013/0243391 A1 | 9/2013 | Park et al. |
| 2013/0258451 A1 | 10/2013 | El-Ghoroury et al. |
| 2013/0262511 A1 | 10/2013 | Kuffner et al. |
| 2013/0286236 A1 | 10/2013 | Mankowski |
| 2013/0321574 A1 | 12/2013 | Zhang et al. |
| 2013/0321581 A1 | 12/2013 | El-Ghoroury |
| 2013/0321677 A1 | 12/2013 | Cote et al. |
| 2013/0329107 A1 | 12/2013 | Burley et al. |
| 2013/0329132 A1 | 12/2013 | Tico et al. |
| 2013/0335596 A1 | 12/2013 | Demandoix et al. |
| 2013/0342700 A1 | 12/2013 | Kass |
| 2014/0002502 A1 | 1/2014 | Han |
| 2014/0002699 A1 | 1/2014 | Guan |
| 2014/0003719 A1 | 1/2014 | Bai et al. |
| 2014/0013273 A1 | 1/2014 | Ng |
| 2014/0035959 A1 | 2/2014 | Lapstun |
| 2014/0037280 A1 | 2/2014 | Shirakawa |
| 2014/0049663 A1 | 2/2014 | Ng et al. |
| 2014/0059462 A1 | 2/2014 | Wernersson |
| 2014/0085282 A1 | 3/2014 | Luebke et al. |
| 2014/0092424 A1 | 4/2014 | Grosz |
| 2014/0098191 A1 | 4/2014 | Rime et al. |
| 2014/0132741 A1 | 5/2014 | Aagaard et al. |
| 2014/0133749 A1 | 5/2014 | Kuo et al. |
| 2014/0139538 A1 | 5/2014 | Barber et al. |
| 2014/0167196 A1 | 6/2014 | Heimgartner et al. |
| 2014/0168484 A1 | 6/2014 | Suzuki |
| 2014/0176540 A1 | 6/2014 | Tosic et al. |
| 2014/0176592 A1 | 6/2014 | Wilburn et al. |
| 2014/0176710 A1 | 6/2014 | Brady |
| 2014/0177905 A1 | 6/2014 | Grefalda |
| 2014/0184885 A1 | 7/2014 | Tanaka et al. |
| 2014/0192208 A1 | 7/2014 | Okincha |
| 2014/0193047 A1 | 7/2014 | Grosz |
| 2014/0195921 A1 | 7/2014 | Grosz |
| 2014/0204111 A1 | 7/2014 | Vaidyanathan et al. |

(56) References Cited

U.S. PATENT DOCUMENTS

| | | |
|---|---|---|
| 2014/0211077 A1 | 7/2014 | Ng et al. |
| 2014/0218540 A1 | 8/2014 | Geiss et al. |
| 2014/0226038 A1 | 8/2014 | Kimura |
| 2014/0240463 A1 | 8/2014 | Pitts et al. |
| 2014/0240578 A1 | 8/2014 | Fishman et al. |
| 2014/0245367 A1 | 8/2014 | Sasaki |
| 2014/0267243 A1 | 9/2014 | Venkataraman et al. |
| 2014/0267639 A1 | 9/2014 | Tatsuta |
| 2014/0300753 A1 | 10/2014 | Yin |
| 2014/0313350 A1 | 10/2014 | Keelan |
| 2014/0313375 A1 | 10/2014 | Milnar |
| 2014/0333787 A1 | 11/2014 | Venkataraman |
| 2014/0340390 A1 | 11/2014 | Lanman et al. |
| 2014/0347540 A1 | 11/2014 | Kang |
| 2014/0354863 A1 | 12/2014 | Ahn et al. |
| 2014/0368494 A1 | 12/2014 | Sakharnykh et al. |
| 2014/0368640 A1 | 12/2014 | Strandemar et al. |
| 2015/0062178 A1 | 3/2015 | Matas et al. |
| 2015/0062386 A1 | 3/2015 | Sugawara |
| 2015/0092071 A1 | 4/2015 | Meng et al. |
| 2015/0097985 A1 | 4/2015 | Akeley |
| 2015/0130986 A1 | 5/2015 | Ohnishi |
| 2015/0193937 A1 | 7/2015 | Georgiev et al. |
| 2015/0206340 A1 | 7/2015 | Munkberg et al. |
| 2015/0207990 A1 | 7/2015 | Ford et al. |
| 2015/0237273 A1 | 8/2015 | Sawadaishi |
| 2015/0104101 A1 | 10/2015 | Bryant et al. |
| 2015/0288867 A1 | 10/2015 | Kajimura |
| 2015/0304544 A1 | 10/2015 | Eguchi |
| 2015/0310592 A1 | 10/2015 | Kano |
| 2015/0312553 A1 | 10/2015 | Ng et al. |
| 2015/0312593 A1 | 10/2015 | Akeley et al. |
| 2015/0346832 A1 | 12/2015 | Cole et al. |
| 2015/0370011 A1 | 12/2015 | Ishihara |
| 2015/0370012 A1 | 12/2015 | Ishihara |
| 2015/0373279 A1 | 12/2015 | Osborne |
| 2016/0029017 A1 | 1/2016 | Liang |
| 2016/0065931 A1 | 3/2016 | Konieczny |
| 2016/0065947 A1 | 3/2016 | Cole et al. |
| 2016/0088287 A1* | 3/2016 | Sadi .................. H04N 19/61 348/43 |
| 2016/0094773 A1* | 3/2016 | Maciuca .............. H04N 5/2624 348/207.11 |
| 2016/0142615 A1 | 5/2016 | Liang |
| 2016/0155215 A1 | 6/2016 | Suzuki |
| 2016/0165206 A1 | 6/2016 | Huang et al. |
| 2016/0173844 A1 | 6/2016 | Knight et al. |
| 2016/0191823 A1 | 6/2016 | El-Ghoroury |
| 2016/0253837 A1 | 9/2016 | Zhu et al. |
| 2016/0269620 A1 | 9/2016 | Romanenko et al. |
| 2016/0307368 A1 | 10/2016 | Akeley |
| 2016/0307372 A1 | 10/2016 | Pitts et al. |
| 2016/0309065 A1 | 10/2016 | Karafin et al. |
| 2016/0353006 A1 | 12/2016 | Anderson |
| 2016/0353026 A1 | 12/2016 | Blonde et al. |
| 2016/0381348 A1 | 12/2016 | Hayasaka |
| 2017/0031146 A1 | 2/2017 | Zheng |
| 2017/0059305 A1 | 3/2017 | Nonn et al. |
| 2017/0067832 A1 | 3/2017 | Ferrara, Jr. et al. |
| 2017/0078578 A1 | 3/2017 | Sato |
| 2017/0094906 A1 | 3/2017 | Liang et al. |
| 2017/0134639 A1 | 5/2017 | Pitts et al. |
| 2017/0139131 A1 | 5/2017 | Karafin et al. |
| 2017/0221226 A1 | 8/2017 | Shen |
| 2017/0237971 A1 | 8/2017 | Pitts et al. |
| 2017/0243373 A1 | 8/2017 | Bevensee et al. |
| 2017/0244948 A1 | 8/2017 | Pang et al. |
| 2017/0256036 A1 | 9/2017 | Song et al. |
| 2017/0263012 A1 | 9/2017 | Sabater et al. |
| 2017/0302903 A1 | 10/2017 | Ng et al. |
| 2017/0330365 A1* | 11/2017 | Adamov ................ H04L 67/10 |
| 2017/0358092 A1 | 12/2017 | Bleibel et al. |
| 2017/0365068 A1 | 12/2017 | Tan et al. |
| 2017/0374411 A1 | 12/2017 | Lederer et al. |
| 2018/0007253 A1 | 1/2018 | Abe |
| 2018/0012397 A1 | 1/2018 | Carothers |
| 2018/0020204 A1 | 1/2018 | Pang et al. |
| 2018/0024753 A1 | 1/2018 | Gewickey et al. |
| 2018/0033209 A1 | 2/2018 | Akeley et al. |
| 2018/0034134 A1 | 2/2018 | Pang et al. |
| 2018/0070066 A1 | 3/2018 | Knight et al. |
| 2018/0070067 A1 | 3/2018 | Knight et al. |
| 2018/0082405 A1 | 3/2018 | Liang |
| 2018/0089903 A1 | 3/2018 | Pang et al. |
| 2018/0097867 A1 | 4/2018 | Pang et al. |
| 2018/0158198 A1 | 6/2018 | Kamad |

FOREIGN PATENT DOCUMENTS

| | | |
|---|---|---|
| DE | 19624421 | 1/1997 |
| JP | 2010020100 | 1/2010 |
| JP | 2011135170 | 7/2011 |
| WO | 2003052465 | 6/2003 |
| WO | 2006039486 | 4/2006 |
| WO | 2007092545 | 8/2007 |
| WO | 2007092581 | 8/2007 |
| WO | 2011010234 | 3/2011 |
| WO | 2011029209 | 3/2011 |
| WO | 2011081187 | 7/2011 |
| WO | 2015104953 A1 | 7/2015 |

OTHER PUBLICATIONS

Meng, J. et al., "An Approach on Hardware Design for Computational Photography Applications Based on Light Field Refocusing Algorithm," Nov. 18, 2007, 12 pages.

Wikipedia—Data overlay techniques for real-time visual feed. For example, heads-up displays: http://en.wikipedia.org/wiki/Head-up_display. Retrieved Jan. 2013.

Wikipedia—Exchangeable image file format: http://en.wikipedia.org/wiki/Exchangeable_image_file_format. Retrieved Jan. 2013.

Wikipedia—Expeed: http://en.wikipedia.org/wiki/EXPEED. Retrieved Jan. 15, 2014.

Wikipedia—Extensible Metadata Platform: http://en.wikipedia.org/wiki/Extensible_Metadata_Plafform. Retrieved Jan. 2013.

Wikipedia—Key framing for video animation: http://en.wikipedia.org/wiki/Key_frame. Retrieved Jan. 2013.

Wikipedia—Lazy loading of image data: http://en.wikipedia.org/wiki/Lazy_loading. Retrieved Jan. 2013.

Wikipedia—Methods of Variable Bitrate Encoding: http://en.wikipedia.org/wiki/Variable_bitrate#Methods_of VBR_encoding. Retrieved Jan. 2013.

Wikipedia—Portable Network Graphics format: http://en.wikipedia.org/wiki/Portable_Network_Graphics. Retrieved Jan. 2013.

Wikipedia—Unsharp Mask Technique: https://en.wikipedia.org/wiki/Unsharp_masking. Retrieved May 3, 2016.

Wilburn et al., "High Performance Imaging using Large Camera Arrays", ACM Transactions on Graphics (TOG), vol. 24, Issue 3 (Jul. 2005), Proceedings of ACM SIGGRAPH 2005, pp. 765-776.

Wilburn, Bennett, et al., "High Speed Video Using a Dense Camera Array", 2004.

Wilburn, Bennett, et al., "The Light Field Video Camera", Proceedings of Media Processors 2002.

Williams, L. "Pyramidal Parametrics," Computer Graphic (1983).

Winnemoller, H., et al., "Light Waving: Estimating Light Positions From Photographs Alone", Eurographics 2005.

Wippermann, F. "Chirped Refractive Microlens Array," Dissertation 2007.

Wuu, S., et al., "A Manufacturable Back-Side Illumination Technology Using Bulk Si Substrate for Advanced CMOS Image Sensors", 2009 International Image Sensor Workshop, Bergen, Norway.

Wuu, S., et al., "BSI Technology with Bulk Si Wafer", 2009 International Image Sensor Workshop, Bergen, Norway.

Xiao, Z. et al., "Aliasing Detection and Reduction in Plenoptic Imaging," IEEE Conference on Computer Vision and Pattern Recognition; 2014.

Xu, Xin et al., "Robust Automatic Focus Algorithm for Low Contrast Images Using a New Contrast Measure," Sensors 2011; 14 pages.

(56) References Cited

OTHER PUBLICATIONS

Zheng, C. et al., "Parallax Photography: Creating 3D Cinematic Effects from Stills", Proceedings of Graphic Interface, 2009.
Zitnick, L. et al., "High-Quality Video View Interpolation Using a Layered Representation," Aug. 2004; ACM Transactions on Graphics (TOG), Proceedings of ACM SIGGRAPH 2004; vol. 23, Issue 3; pp. 600-608.
Zoberbier, M., et al., "Wafer Cameras—Novel Fabrication and Packaging Technologies", 2009 International Image Senor Workshop, Bergen, Norway, 5 pages.
U.S. Appl. No. 15/967,076, filed Apr. 30, 2018 listing Jiantao Kuang et al. as inventors, entitled "Automatic Lens Flare Detection and Correction for Light-Field Images".
U.S. Appl. No. 15/666,298, filed Aug. 1, 2017 listing Yonggang Ha et al. as inventors, entitled "Focal Reducer with Controlled Optical Properties for Interchangeable Lens Light-Field Camera".
U.S. Appl. No. 15/590,808, filed May 9, 2017 listing Alex Song et al. as inventors, entitled "Adaptive Control for Immersive Experience Delivery".
U.S. Appl. No. 15/864,938, filed Jan. 8, 2018 listing Jon Karafin et al. as inventors, entitled "Motion Blur for Light-Field Images".
U.S. Appl. No. 15/703,553, filed Sep. 13, 2017 listing Jon Karafin et al. as inventors, entitled "4D Camera Tracking and Optical Stabilization".
U.S. Appl. No. 15/590,841, filed May 9, 2017 listing Kurt Akeley et al. as inventors, entitled "Vantage Beneration and Interactive Playback".
U.S. Appl. No. 15/590,951, filed May 9, 2017 listing Alex Song et al. as inventors, entitled "Wedge-Based Light-Field Video Capture".
U.S. Appl. No. 15/944,551, filed Apr. 3, 2018 listing Zejing Wang et al. as inventors, entitled "Generating Dolly Zoom Effect Using Light Field Image Data".
U.S. Appl. No. 15/897,994, filed Feb. 15, 2018 listing Trevor Carothers et al. as inventors, entitled "Generation of Virtual Reality With 6 Degrees of Freesom From Limited Viewer Data".
U.S. Appl. No. 15/605,037, filed May 25, 2017 listing Zejing Wang et al. as inventors, entitled "Multi-View Back-Projection to a Light-Field".
U.S. Appl. No. 15/897,836, filed Feb. 15, 2018 listing Francois Bleibel et al. as inventors, entitled "Multi-View Contour Tracking".
U.S. Appl. No. 15/897,942, filed Feb. 15, 2018 listing Francois Bleibel et al. as inventors, entitled "Multi-View Contour Tracking With Grabcut".
Adelsberger, R. et al., "Spatially Adaptive Photographic Flash," ETH Zurich, Department of Computer Science, Technical Report 612, 2008, pp. 1-12.
Adelson et al., "Single Lens Stereo with a Plenoptic Camera" IEEE Translation on Pattern Analysis and Machine Intelligence, Feb. 1992. vol. 14, No. 2, pp. 99-106.
Adelson, E. H., and Bergen, J. R. 1991. The plenoptic function and the elements of early vision. In Computational Models of Visual Processing, edited by Michael S. Landy and J. Anthony Movshon. Cambridge, Mass.: mit Press.
Adobe Systems Inc, "XMP Specification", Sep. 2005.
Adobe, "Photoshop CS6 / in depth: Digital Negative (DNG)", http://www.adobe.com/products/photoshop/extend. displayTab2html. Retrieved Jan. 2013.
Agarwala, A., et al., "Interactive Digital Photomontage," ACM Transactions on Graphics, Proceedings of SIGGRAPH 2004, vol. 32, No. 3, 2004.
Andreas Observatory, Spectrograph Manual: IV. Flat-Field Correction, Jul. 2006.
Apple, "Apple iPad: Photo Features on the iPad", Retrieved Jan. 2013.
Bae, S., et al., "Defocus Magnification", Computer Graphics Forum, vol. 26, Issue 3 (Proc. of Eurographics 2007), pp. 1-9.
Belhumeur, Peter et al., "The Bas-Relief Ambiguity", International Journal of Computer Vision, 1997, pp. 1060-1066.
Belhumeur, Peter, et al., "The Bas-Relief Ambiguity", International Journal of Computer Vision, 1999, pp. 33-44, revised version.
Bhat, P. et al. "GradientShop: A Gradient-Domain Optimization Framework for Image and Video Filtering," SIGGRAPH 2010; 14 pages.
Bolles, R., et al., "Epipolar-Plane Image Analysis: An Approach to Determining Structure from Motion", International Journal of Computer Vision, 1, 7-55 (1987).
Bourke, Paul, "Image filtering in the Frequency Domain," pp. 1-9, Jun. 1998.
Canon, Canon Speedlite wireless flash system, User manual for Model 550EX, Sep. 1998.
Chai, Jin-Xang et al., "Plenoptic Sampling", ACM SIGGRAPH 2000, Annual Conference Series, 2000, pp. 307-318.
Chen, S. et al., "A CMOS Image Sensor with On-Chip Image Compression Based on Predictive Boundary Adaptation and Memoryless QTD Algorithm," Very Large Scalee Integration (VLSI) Systems, IEEE Transactions, vol. 19, Issue 4; Apr. 2011.
Chen, W., et al., "Light Field mapping: Efficient representation and hardware rendering of surface light fields", ACM Transactions on Graphics 21, 3, 447-456, 2002.
Cohen, Noy et al., "Enhancing the performance of the light field microscope using wavefront coding," Optics Express, vol. 22, issue 20; 2014.
Daly, D., "Microlens Arrays" Retrieved Jan. 2013.
Debevec, et al, "A Lighting Reproduction Approach to Live-Action Compoisting" Proceedings SIGGRAPH 2002.
Debevec, P., et al., "Acquiring the reflectance field of a human face", SIGGRAPH 2000.
Debevec, P., et al., "Recovering high dynamic radiance maps from photographs", SIGGRAPH 1997, 369-378.
Design of the xBox menu. Retrieved Jan. 2013.
Digital Photography Review, "Sony Announce new RGBE CCD," Jul. 2003.
Dorsey, J., et al., "Design and simulation of opera light and projection effects", in Computer Graphics (Proceedings of SIGGRAPH 91), vol. 25, 41-50.
Dorsey, J., et al., "Interactive design of complex time dependent lighting", IEEE Computer Graphics and Applications 15, 2 (Mar. 1995), 26-36.
Dowski et al., "Wavefront coding: a modern method of achieving high performance and/or low cost imaging systems" SPIE Proceedings, vol. 3779, Jul. 1999, pp. 137-145.
Dowski, Jr. "Extended Depth of Field Through Wave-Front Coding," Applied Optics, vol. 34, No. 11, Apr. 10, 1995; pp. 1859-1866.
Duparre, J. et al., "Micro-Optical Artificial Compound Eyes," Institute of Physics Publishing, Apr. 2006.
Eisemann, Elmar, et al., "Flash Photography Enhancement via Intrinsic Relighting", SIGGRAPH 2004.
Fattal, Raanan, et al., "Multiscale Shape and Detail Enhancement from Multi-light Image Collections", SIGGRAPH 2007.
Fernando, Randima, "Depth of Field—A Survey of Techniques," GPU Gems. Boston, MA; Addison-Wesley, 2004.
Fitzpatrick, Brad, "Camlistore", Feb. 1, 2011.
Fujifilm, Super CCD EXR Sensor by Fujifilm, brochure reference No. EB-807E, 2008.
Georgiev, T. et al., "Reducing Plenoptic Camera Artifacts," Computer Graphics Forum, vol. 29, No. 6, pp. 1955-1968; 2010.
Georgiev, T., et al., "Spatio-Angular Resolution Tradeoff in Integral Photography," Proceedings of Eurographics Symposium on Rendering, 2006.
Nimeroff, J., et al., "Efficient rendering of naturally illuminatied environments" in Fifth Eurographics Workshop on Rendering, 359-373, 1994.
Nokia, "City Lens", May 2012.
Ogden, J., "Pyramid-Based Computer Graphics", 1985.
Okano et al., "Three-dimensional video system based on integral photography" Optical Engineering, Jun. 1999. vol. 38, No. 6, pp. 1072-1077.
Orzan, Alexandrina, et al., "Diffusion Curves: A Vector Representation for Smooth-Shaded Images," ACM Transactions on Graphics—Proceedings of SIGGRAPH 2008; vol. 27; 2008.
Pain, B., "Back-Side Illumination Technology for SOI-CMOS Image Sensors", 2009.

(56) References Cited

OTHER PUBLICATIONS

Perez, Patrick et al., "Poisson Image Editing," ACM Transactions on Graphics—Proceedings of ACM SIGGRAPH 2003; vol. 22, Issue 3; Jul. 2003; pp. 313-318.
Petschnigg, George, et al., "Digial Photography with Flash and No-Flash Image Pairs", SIGGRAPH 2004.
Primesense, "The Primesense 3D Awareness Sensor", 2007.
Ramamoorthi, R., et al, "Frequency space environment map rendering" ACM Transactions on Graphics (SIGGRAPH 2002 proceedings) 21, 3, 517-526.
Ramamoorthi, R., et al., "An efficient representation for irradiance environment maps", in Proceedings of SIGGRAPH 2001, 497-500.
Raskar, Ramesh et al., "Glare Aware Photography: 4D Ray Sampling for Reducing Glare Effects of Camera Lenses," ACM Transactions on Graphics—Proceedings of ACM SIGGRAPH, Aug. 2008; vol. 27, Issue 3; pp. 1-10.
Raskar, Ramesh et al., "Non-photorealistic Camera: Depth Edge Detection and Stylized Rendering using Multi-Flash Imaging", SIGGRAPH 2004.
Raytrix, "Raytrix Lightfield Camera," Raytrix GmbH, Germany 2012, pp. 1-35.
Roper Scientific, Germany "Fiber Optics," 2012.
Scharstein, Daniel, et al., "High-Accuracy Stereo Depth Maps Using Structured Light," CVPR'03 Proceedings of the 2003 IEEE Computer Society, pp. 195-202.
Schirmacher, H. et al., "High-Quality Interactive Lumigraph Rendering Through Warping," May 2000, Graphics Interface 2000.
Shade, Jonathan, et al., "Layered Depth Images", SIGGRAPH 98, pp. 1-2.
Shreiner, OpenGL Programming Guide, 7th edition, Chapter 8, 2010.
Simpleviewer, "Tiltview", http://simpleviewer.net/tiltviewer. Retrieved Jan. 2013.
Skodras, A. et al., "The JPEG 2000 Still Image Compression Standard," Sep. 2001, IEEE Signal Processing Magazine, pp. 36-58.
Sloan, P., et al., "Precomputed radiance transfer for real-time rendering in dynamic, low-frequency lighting environments", ACM Transactions on Graphics 21, 3, 527-536, 2002.
Snavely, Noah, et al., "Photo-tourism: Exploring Photo collections in 3D", ACM Transactions on Graphics (SIGGRAPH Proceedings), 2006.
Sokolov, "Autostereoscopy and Integral Photography by Professor Lippmann's Method" , 1911, pp. 23-29.
Sony Corp, "Interchangeable Lens Digital Camera Handbook", 2011.
Sony, Sony's First Curved Sensor Photo: http://www.engadget.com; Jul. 2014.
Stensvold, M., "Hybrid AF: A New Approach to Autofocus Is Emerging for both Still and Video", Digital Photo Magazine, Nov. 13, 2012.
Story, D., "The Future of Photography", Optics Electronics, Oct. 2008.
Sun, Jian, et al., "Stereo Matching Using Belief Propagation", 2002.
Tagging photos on Flickr, Facebook and other online photo sharing sites (see, for example, http://support.gnip.com/customer/portal/articles/809309-flickr-geo-photos-tag-search). Retrieved Jan. 2013.
Takahashi, Keita, et al., "All in-focus View Synthesis from Under-Sampled Light Fields", ICAT 2003, Tokyo, Japan.
Tanida et al., "Thin observation module by bound optics (TOMBO): concept and experimental verification" Applied Optics 40, 11 (Apr. 10, 2001), pp. 1806-1813.
Tao, Michael, et al., "Depth from Combining Defocus and Correspondence Using Light-Field Cameras", Dec. 2013.
Techcrunch, "Coolinis", Retrieved Jan. 2013.
Teo, P., et al., "Efficient linear rendering for interactive light design", Tech. Rep. STAN-CS-TN-97-60, 1998, Stanford University.
Teranishi, N. "Evolution of Optical Structure in Images Sensors," Electron Devices Meeting (IEDM) 2012 IEEE International; Dec. 10-13, 2012.
Vaish et al., "Using plane + parallax for calibrating dense camera arrays", In Proceedings CVPR 2004, pp. 2-9.
Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.
VR Playhouse, "The Surrogate," http://www.vrplayhouse.com/the-surrogate.
Wanner, S. et al., "Globally Consistent Depth Labeling of 4D Light Fields," IEEE Conference on Computer Vision and Pattern Recognition, 2012.
Wanner, S. et al., "Variational Light Field Analysis for Disparity Estimation and Super-Resolution," IEEE Transacations on Pattern Analysis and Machine Intellegence, 2013.
Wenger, et al, "Performance Relighting and Reflectance Transformation with Time-Multiplexed Illumination", Institute for Creative Technologies, SIGGRAPH 2005.
Wetzstein, Gordon, et al., "Sensor Saturation in Fourier Multiplexed Imaging", IEEE Conference on Computer Vision and Pattern Recognition (2010).
Wikipedia—Adaptive Optics: http://en.wikipedia.org/wiki/adaptive_optics. Retrieved Feb. 2014.
Wikipedia—Autofocus systems and methods: http://en.wikipedia.org/wiki/Autofocus. Retrieved Jan. 2013.
Wikipedia—Bayer Filter: http:/en.wikipedia.org/wiki/Bayer_filter. Retrieved Jun. 20, 2013.
Wikipedia—Color Image Pipeline: http://en.wikipedia.org/wiki/color_image_pipeline. Retrieved Jan. 15, 2014.
Wikipedia—Compression standard JPEG XR: http://en.wikipedia.org/wiki/JPEG_XR. Retrieved Jan. 2013.
Wikipedia—CYGM Filter: http://en.wikipedia.org/wiki/CYGM_filter. Retrieved Jun. 20, 2013.
Georgiev, T., et al., "Suppersolution with Plenoptic 2.0 Cameras," Optical Society of America 2009; pp. 1-3.
Georgiev, T., et al., "Unified Frequency Domain Analysis of Lightfield Cameras" (2008).
Georgiev, T., et al., Plenoptic Camera 2.0 (2008).
Girod, B., "Mobile Visual Search", IEEE Signal Processing Magazine, Jul. 2011.
Gortler et al., "The lumigraph" SIGGRAPH 96, pp. 43-54.
Groen et al., "A Comparison of Different Focus Functions for Use in Autofocus Algorithms," Cytometry 6:81-91, 1985.
Haeberli, Paul "A Multifocus Method for Controlling Depth of Field" GRAPHICA Obscura, 1994, pp. 1-3.
Heide, F. et al., "High-Quality Computational Imaging Through Simple Lenses," ACM Transactions on Graphics, SIGGRAPH 2013; pp. 1-7.
Heidelberg Collaboratory for Image Processing, "Consistent Depth Estimation in a 4D Light Field," May 2013.
Hirigoyen, F., et al., "1.1 um Backside Imager vs. Frontside Image: an optics-dedicated FDTD approach", IEEE 2009 International Image Sensor Workshop.
Huang, Fu-Chung et al., "Eyeglasses-free Display: Towards Correcting Visual Aberrations with Computational Light Field Displays," ACM Transaction on Graphics, Aug. 2014, pp. 1-12.
Isaksen, A., et al., "Dynamically Reparameterized Light Fields," SIGGRAPH 2000, pp. 297-306.
Ives H., "Optical properties of a Lippman lenticulated sheet," J. Opt. Soc. Am. 21, 171 (1931).
Ives, H. "Parallax Panoramagrams Made with a Large Diameter Lens", Journal of the Optical Society of America; 1930.
Jackson et al., "Selection of a Convolution Function for Fourier Inversion Using Gridding" IEEE Transactions on Medical Imaging, Sep. 1991, vol. 10, No. 3, pp. 473-478.
Kautz, J., et al., "Fast arbitrary BRDF shading for low-frequency lighting using spherical harmonics", in Eurographic Rendering Workshop 2002, 291-296.
Koltun, et al., "Virtual Occluders: An Efficient Interediate PVS Representation", Rendering Techniques 2000: Proc. 11th Eurographics Workshop Rendering, pp. 59-70, Jun. 2000.
Kopf, J., et al., Deep Photo: Model-Based Photograph Enhancement and Viewing, SIGGRAPH Asia 2008.

(56) References Cited

OTHER PUBLICATIONS

Lehtinen, J., et al. "Matrix radiance transfer", in Symposium on Interactive 3D Graphics, 59-64, 2003.
Lesser, Michael, "Back-Side Illumination", 2009.
Levin, A., et al., "Image and Depth from a Conventional Camera with a Coded Aperture", SIGGRAPH 2007, pp. 1-9.
Levoy et al.,"Light Field Rendering" SIGGRAPH 96 Proceeding, 1996. pp. 31-42.
Levoy, "Light Fields and Computational Imaging" IEEE Computer Society, Aug. 2006, pp. 46-55.
Levoy, M. "Light Field Photography and Videography," Oct. 18, 2005.
Levoy, M. "Stanford Light Field Microscope Project," 2008; http://graphics.stanford.edu/projects/lfmicroscope/, 4 pages.
Levoy, M., "Autofocus: Contrast Detection", http://graphics.stanford.edu/courses/cs178/applets/autofocusPD.html, pp. 1-3, 2010.
Levoy, M., "Autofocus: Phase Detection", http://graphics.stanford.edu/courses/cs178/applets/autofocusPD.html, pp. 1-3, 2010.
Levoy, M., et al., "Light Field Microscopy," ACM Transactions on Graphics, vol. 25, No. 3, Proceedings SIGGRAPH 2006.
Liang, Chia-Kai, et al., "Programmable Aperture Photography: Multiplexed Light Field Acquisition", ACM SIGGRAPH, 2008.
Lippmann, "Reversible Prints", Communication at the French Society of Physics, Journal of Physics, 7, Mar. 4, 1908, pp. 821-825.
Lumsdaine et al., "Full Resolution Lightfield Rendering" Adobe Technical Report Jan. 2008, pp. 1-12.
Maeda, Y. et al., "A CMOS Image Sensor with Pseudorandom Pixel Placement for Clear Imaging," 2009 International Symposium on Intelligent Signal Processing and Communication Systems, Dec. 2009.
Magnor, M. et al., "Model-Aided Coding of Multi-Viewpoint Image Data," Proceedings IEEE Conference on Image Processing, ICIP-2000, Vancouver, Canada, Sep. 2000. https://graphics.tu-bs.de/static/people/magnor/publications/icip00.pdf.
Mallat, Stephane, "A Wavelet Tour of Signal Processing", Academic Press 1998.
Malzbender, et al., "Polynomial Texture Maps", Proceedings SIGGRAPH 2001.
Marshall, Richard J. et al., "Improving Depth Estimation from a Plenoptic Camera by Patterned Illumination," Proc. of SPIE, vol. 9528, 2015, pp. 1-6.
Masselus, Vincent, et al., "Relighting with 4D Incident Light Fields", SIGGRAPH 2003.
Meynants, G., et al., "Pixel Binning in CMOS Image Sensors," Frontiers in Electronic Imaging Conference, 2009.
Moreno-Noguer, F. et al., "Active Refocusing of Images and Videos," ACM Transactions on Graphics, Aug. 2007; pp. 1-9.
Munkberg, J. et al., "Layered Reconstruction for Defocus and Motion Blur" EGSR 2014, pp. 1-12.
Niaemura et al., "3-D Computer Graphics based on Integral Photography" Optics Express, Feb. 12, 2001. vol. 8, No. 2, pp. 255-262.
Nakamura, J., "Image Sensors and Signal Processing for Digital Still Cameras" (Optical Science and Engineering), 2005.
National Instruments, "Anatomy of a Camera," pp. 1-5, Sep. 6, 2006.
Nayar, Shree, et al., "Shape from Focus", IEEE Transactions on Pattern Analysis and Machine Intelligence, vol. 16, No. 8, pp. 824-831, Aug. 1994.
Ng, R., et al. "Light Field Photography with a Hand-held Plenoptic Camera," Stanford Technical Report, CSTR 2005-2, 2005.
Ng, R., et al., "All-Frequency Shadows Using Non-linear Wavelet Lighting Approximation. ACM Transactions on Graphics," ACM Transactions on Graphics; Proceedings of SIGGRAPH 2003.
Ng, R., et al., "Triple Product Wavelet Integrals for All-Frequency Relighting", ACM Transactions on Graphics (Proceedings of SIGGRAPH 2004).
Ng, Yi-Ren, "Digital Light Field Photography," Doctoral Thesis, Standford University, Jun. 2006; 203 pages.
Ng., R., "Fourier Slice Photography," ACM Transactions on Graphics, Proceedings of SIGGRAPH 2005, vol. 24, No. 3, 2005, pp. 735-744.
Nguyen, Hubert. "Practical Post-Process Depth of Field." GPU Gems 3. Upper Saddle River, NJ: Addison-Wesley, 2008.
International Preliminary Report on Patentability dated Jul. 30, 2020 for International Application No. PCT/US2019/013645, 8 pages.

\* cited by examiner

MULTI-CAMERA NAVIGATION INTERFACE

CROSS-REFERENCE TO RELATED APPLICATIONS

The present application is related to U.S. application Ser. No. 15/084,326 for "Capturing Light-Field Volume Image and Video Data Using Tiled Light-Field Cameras", filed Mar. 29, 2016, the disclosure of which is incorporated herein by reference in its entirety.

The present application is related to U.S. application Ser. No. 15/582,237 for "Image Capture for Virtual Reality Displays", filed Apr. 28, 2017, the disclosure of which is incorporated herein by reference in its entirety.

The present application is also related to U.S. application Ser. No. 15/590,877 for "Spatial Random Access Enabled Video System with a Three-Dimensional Viewing Volume", filed May 9, 2017, the disclosure of which is incorporated herein by reference in its entirety.

The present application is also related to U.S. application Ser. No. 15/590,951 for "Wedge-Based Light-Field Video Capture", filed May 9, 2017, the disclosure of which is incorporated herein by reference in its entirety.

TECHNICAL FIELD

The present document relates to improved techniques for navigating among camera views in a multi-camera system.

BACKGROUND

The above-referenced related applications describe multi-camera systems wherein views from multiple cameras are combined to generate, for example, a light-field image or video stream that can be used in generating virtual reality (VR) or augmented reality (AR) content.

In many software applications for content creation, it is useful to navigate among views from multiple cameras. One such example is Nuke, a compositing suite available from Foundry, of London, United Kingdom. In generating VR or AR content, it is often necessary to navigate among dozens of video feeds, which can be challenging if the navigation interface is not clear and intuitive.

SUMMARY

In various embodiments, an improved interface is provided for navigating among views in a multi-camera environment. In addition to providing improved ease of use, such an interface also provides an overview of the scene represented by the captured video, by virtue of the positioning of various user interface elements representing different camera views.

In at least one embodiment, the navigation interface includes a number of selectable user interface elements, arranged in a fashion that approximates the physical positions of the cameras. Each element corresponds to one of the cameras. Tapping or clicking on one of the elements causes a main window to display a current view from the corresponding camera or video feed. In at least one embodiment, each element identifies the camera to which it corresponds, for example by a label, icon, number, or the like. In another embodiment, each element is a thumbnail image of a representative view from the corresponding camera. The thumbnail image can be a still image, or it can be a video stream displaying a view from the corresponding camera (which may be either a live view or a recorded view). The video stream can optionally be accompanied by identifying information, labels, captions, timing data, and/or the like.

In at least one embodiment, the navigation interface can be implemented in a live video capture system, so as to facilitate navigation among live video feeds during capture. In such an embodiment, the selectable user interface elements can represent live images from the cameras of a multi-camera rig, allowing the user to select and/or control cameras during capture operations. The user interface elements are arranged in a fashion that approximates the physical positions of the cameras from which the live views are being captured. Tapping or clicking on an element causes the main window to display the live video feed from the corresponding camera. In at least one embodiment, multiple elements can be selected simultaneously, so that the main screen shows multiple views at the same time.

In another embodiment, the navigation interface can be implemented in a post-production system, so as to facilitate navigation among previously captured video feeds during capture. In such an embodiment, the selectable user interface elements can represent various video feeds captured from different cameras of a multi-camera rig, allowing the user to select among the various feeds during post-processing operations. The elements are arranged in a fashion that approximates the physical positions of the cameras from which the views were captured. Tapping or clicking on an element causes the main window to display the captured video from the corresponding camera. In at least one embodiment, multiple elements can be selected simultaneously, so that the main screen shows multiple views at the same time.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

DETAILED DESCRIPTION

Definitions

Figure 1A:
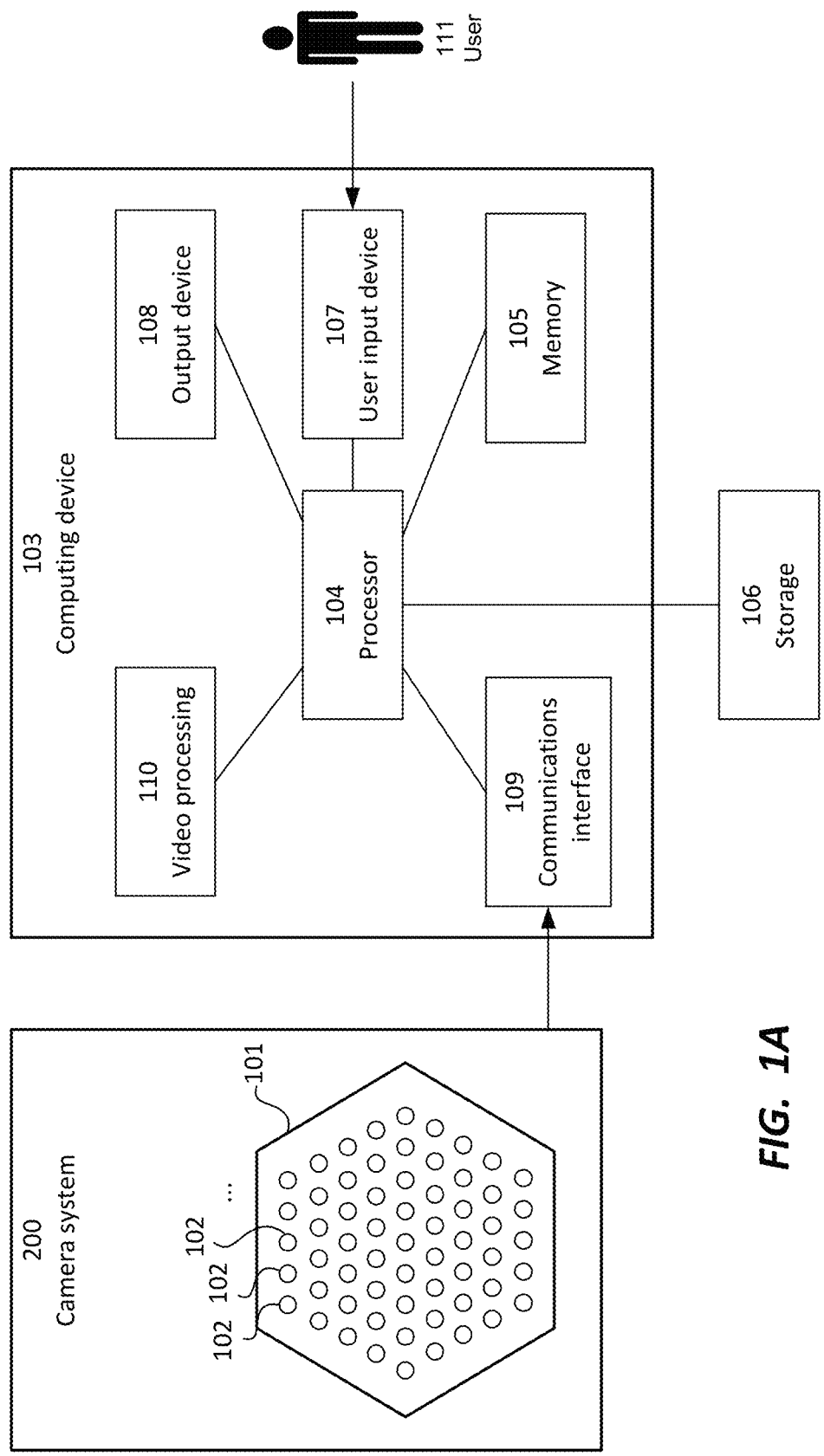
FIG. 1A is a block diagram depicting an overall architecture of a system for implementing a user interface for navigating among different camera views during live capture, according to one embodiment.

For purposes of the description provided herein, the following definitions are used:

| | |
|---|---|
| Light-field image | A four-dimensional sample representing information carried by ray bundles of light depicting an environment. Each ray may be indexed by a standard four-dimensional coordinate system. |
| Light-field volume | The combination of all images captured into a single data set. A light-field volume may be fully or sparsely sampled. |
| Capture system | Any system usable for capturing images, video, light-field images, virtual reality images, augmented reality images, and/or a light-field volume. One example of a capture system is an array of cameras used to capture a light-field volume. Other examples include a camera system and a light-field camera (including a plenoptic light-field camera or a tiled camera array). |
| Light-field camera | A device that can capture a light-field image. |
| Plenoptic light-field camera | A microlens-based implementation of a light-field camera, wherein a plenoptic microlens array is inserted between the objective lens and the photosensor, as described in more detail in the above-referenced related applications. |
| Plenoptic microlens array | A microlens array in a plenoptic camera that is used to capture the directional information. Each microlens in the array may create an image of the aperture stop of the objective lens on the surface of the sensor, as described in more detail in the above-referenced related applications. |
| Tiled camera array | A specific implementation of a light-field camera, containing an array of objective lenses with overlapping fields-of-view and one or more photosensors. |
| Virtual reality (VR) | An immersive viewing experience, typically delivered by a VR headset or other device. |
| Viewing volume | A volume in three-dimensional space for which the data exists to render virtual views. A viewing volume may have any shape. |
| Augmented reality (AR) | An immersive viewing experience that includes a combination of virtual reality elements with real-world surroundings and objects, typically delivered by an AR headset or other device. |
| Video stream | Video data that can be used to generate one or more views of a scene for display for a viewer. |
| View | The subset of a multi-view video stream pertaining to a single viewpoint. |
| Data store | One or more devices that store data temporarily or on a lasting basis, in volatile and/or nonvolatile form. |
| Input device | Any device that captures user input. |
| Processor | Any device capable of processing information in digital form. |

In addition, for ease of nomenclature, the terms "camera", "rig", and "capture system" are used herein to refer to image capture devices or other data acquisition devices. Such data acquisition devices can be any device, rig, system, or combination for acquiring, recording, measuring, estimating, determining and/or computing data representative of a scene, including but not limited to two-dimensional image data, three-dimensional image data, virtual reality (VR) data, augmented reality (AR) data video, volumetric video, and/or light-field data. Such data acquisition devices may include optics, sensors, and image processing electronics for acquiring data representative of a scene, using techniques that are well known in the art. One skilled in the art will recognize that many types of data acquisition devices can be used in connection with the present disclosure, and that the disclosure is not limited to particular types of cameras, rigs, or capture systems. Thus, the use of the terms "camera", "rig", and "capture system" herein is intended to be illustrative and exemplary, but should not be considered to limit the scope of the disclosure. Specifically, any use of such term herein should be considered to refer to any suitable device for acquiring video, image data, VR data, and/or AR data.

Furthermore, the techniques and methods presented herein may be used in connection with a wide variety of camera and rig types. Even though several examples utilize a tiled camera array, one of skill in the art will recognize how the described methods and techniques could be applied to other types of light-field cameras and/or image capture systems, such as plenoptic light-field cameras.

Architecture

Referring now to FIG. 1A, there is shown a block diagram depicting an overall architecture of a system for implementing a user interface for navigating among different camera views during live capture, according to one embodiment.

Camera system 200 includes a rig 101, which in turn includes any number of cameras 102 configured to capture video representing a scene. Cameras 102 can be positioned according to any suitable arrangement; in at least one embodiment, they are positioned in a planar arrangement wherein they all point in the same direction but capture different views of the scene. In other embodiments, cameras 102 can be positioned in a non-planar arrangement. Examples of different arrangements for cameras 102 of rig 101 are set forth in the above-referenced related applications. The particular configuration depicted in FIG. 1A, wherein cameras 102 are arranged in a planar grid to form a hexagon, is merely exemplary.

In at least one embodiment, cameras 102 are configured to capture various views of a scene for purposes of constructing a virtual reality environment or augmented reality environment. Thus, cameras 102 may be positioned so that the video streams they capture can be assembled in a manner that allows a user to interact and move within the environment, for example by changing his or her position and/or orientation. As is known in the art, during playback, in response to such changes, the view presented to the user is changed so as to simulate an actual physical environment through which the user can navigate.

In at least one embodiment, the system also includes computing device 103, which includes various components for receiving images from camera system 200, presenting such images to user 111, and receiving input from user 111 to control the displayed view. Computing device 103 can be a computer, tablet, laptop, smartphone, kiosk, set-top box, and/or any other electronic device or combination of electronic devices, although for illustrative purposes it is depicted herein as a single device. In at least one embodiment, computing device 103 operates under the control and direction of software run by processor 104. In various embodiments, the functionality described herein can be implemented as a stand-alone software application or as a plug-in for any software application for controlling a camera system.

Computing device 103 also includes memory 105 that can be used by processor 104 in performing its operations and running software, and/or for buffering video data received from camera system 200. Output device 108 may include, for example, one or more display screens for presenting video output to user 111. Communications interface 109 can be any electronic component suited for receiving video data from camera system 200. Video processing component 110 can be any suitable electronic or software component for processing such video data as appropriate for display on output device 108, in accordance with the techniques described herein. User input device 107 can be any suitable input device operable by user 111 to control, for example, the display of video data on output device 108. In various embodiments, user input device 107 can be a touchscreen, mouse, joystick, keyboard, trackball, stylus, and/or any combination thereof. Data storage 106, which may be internal or external with respect to device 103, can be used for storing video data from camera system 200 and/or other data, such as a record of user 111 actions and selections with respect to the video data, for future use.

Figure 1B:
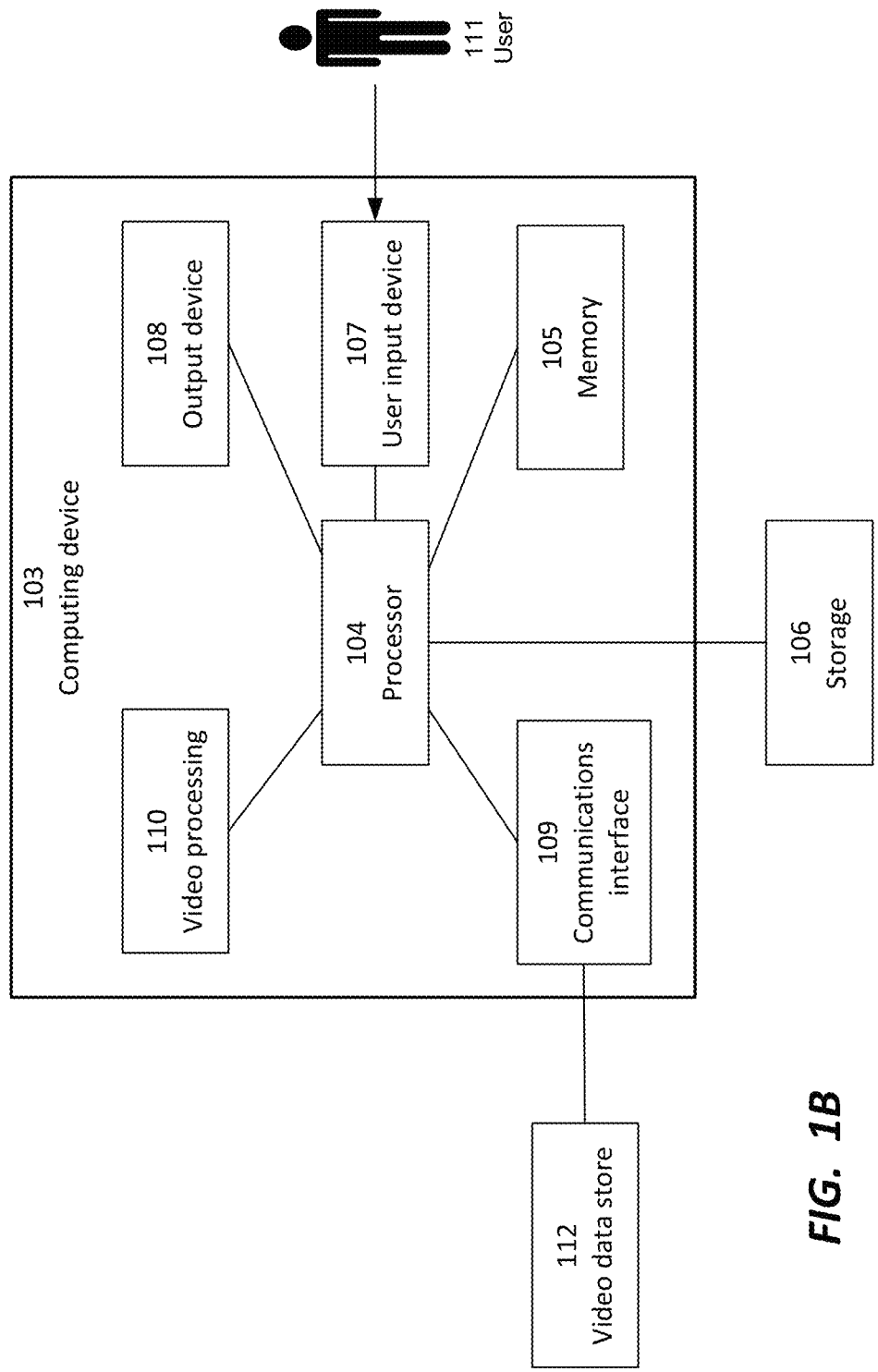
FIG. 1B is a block diagram depicting an overall architecture of a system for implementing a user interface for navigating among different camera views during post-production, according to one embodiment.

Referring now to FIG. 1B, there is shown a block diagram depicting an overall architecture of a system for implementing a user interface for navigating among different camera views during post-production, according to one embodiment. The architecture depicted in FIG. 1B is similar to that of FIG. 1A, except that camera system 200 and rig 101 are omitted, as computing device 103 retrieves video data from video data store 112 rather than from camera system 200. Video data in video data store 112 may include, for example, video and/or images previously captured by a camera system (such as camera system 200) and stored in data store 112, or it can come from other sources. In this manner, device 103 can be used for controlling playback and editing of data in a post-production context wherein video data was previously captured and stored. Such an embodiment may be used, for example, in editing of a virtual reality presentation, augmented reality presentation, or other type of immersive multi-camera presentation. In at least one such embodiment, the system is implemented as a plug-in for a visual effects software application such as Nuke (a compositing suite available from Foundry, of London, United Kingdom), or as a stand-alone software application or plug-in for any other post-processing system.

Figure 1C:
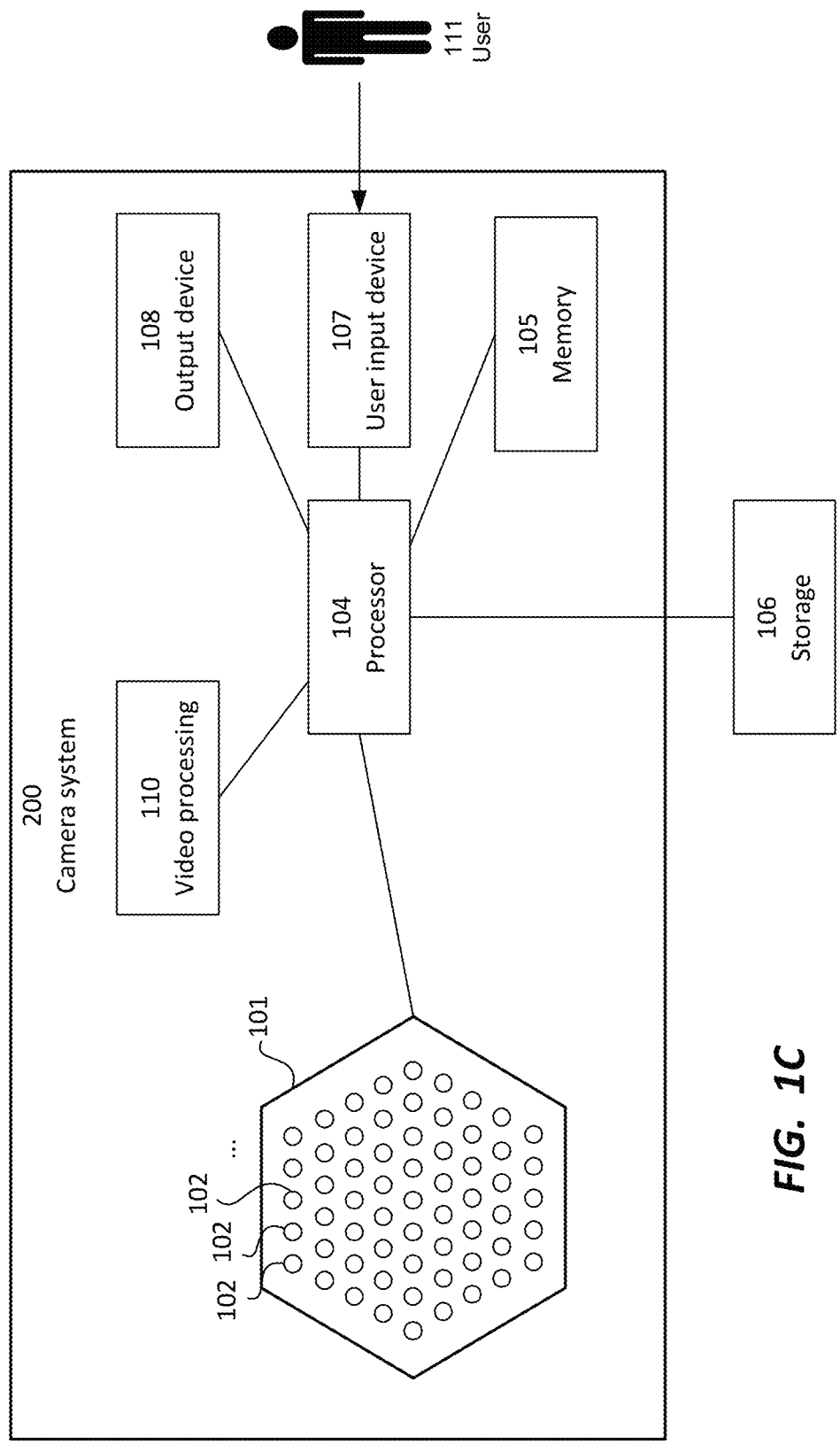
FIG. 1C is a block diagram depicting an overall architecture of a system for implementing a user interface for navigating among different camera views as implemented on a camera system, according to one embodiment.

Referring now to FIG. 1C, there is shown a block diagram depicting an overall architecture of a system for implementing a user interface for navigating among different camera views as implemented on a camera system, according to one embodiment. Here, various components such as processor 104, output device 108, video processing module 110, user input device 107, and memory 105 are components of camera system 200 itself, rather than a separate computing device. For example, output device 108 can be implemented as a screen on camera rig 101. Such an arrangement allows user 111 to manipulate and control camera system 200 based on the output displayed on output device 108. In addition, in at least one embodiment, user 111 interacts with user input device 107 to control the operation of camera system 200. In other respects, the architecture depicted in FIG. 1C operates similarly to that of FIG. 1A.

Figure 2:
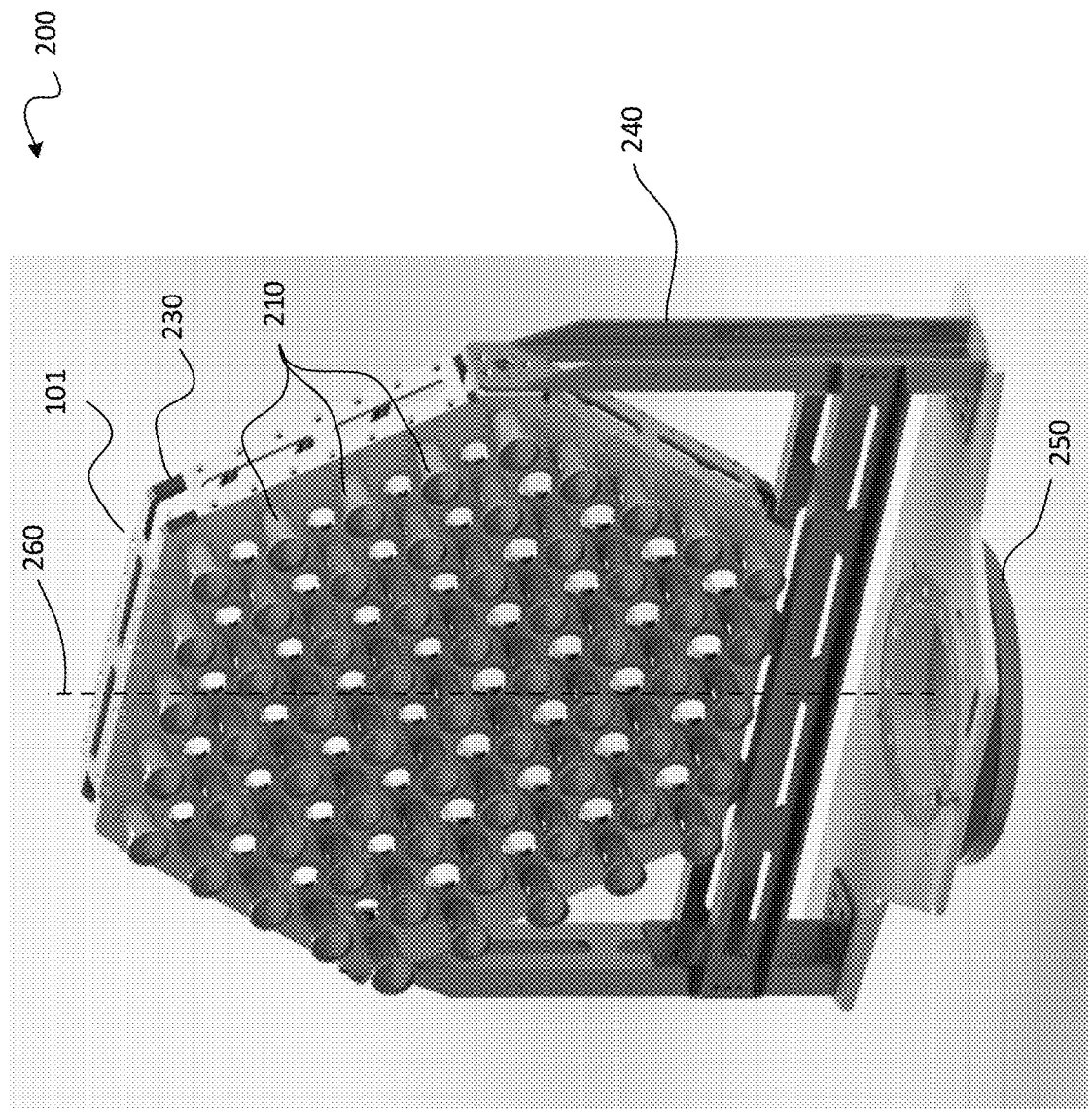
FIG. 2 depicts an example of a multi-camera system.

Referring now to FIG. 2, there is shown an example of a multi-camera system 200 that can be used in connection with the apparatus of FIG. 1A or 1C, according to one embodiment, or for capturing the video data stored in video data store 112 of FIG. 1B. Rig 101 includes a set of cameras 102, which may be arranged to define a planar array having a generally hexagonal shape. One skilled in the art will recognize that other arrangements and shapes are possible. Each of the cameras 102 may be a plenoptic light-field camera as described in the above-referenced related applications, or a conventional camera of any type known in the art. Video data and/or image data captured by cameras 102 may be combined to define a light-field even if cameras 102 are conventional cameras. According to some examples, each camera 102 may have a field-of-view encompassing an angle of 90°, both vertically and horizontally. Camera system 200 may optionally include a synchronization trigger (not shown) that can be used to automatically activate cameras 102 in rig 101, audio recording equipment (not shown), and/or audio playback equipment (not shown) to facilitate synchronization of video captured by cameras 102 in rig 101 with audio and/or video captured by cameras 102 in rig 101 at different orientations.

In at least one embodiment, cameras 102 may be secured to a plate 230, which may be rotatably coupled to a frame 240. Plate 230 may be selectively angled relative to frame 240 to permit cameras 102 to be oriented horizontally as shown, or tilted upward or downward. Frame 240 may be rotatably coupled to a base 250. A motor (not shown) may optionally be coupled to frame 240 to rotate frame 240 relative to base 250. The rotation may be about an axis 260.

The ability to rotate frame 240 on base 250 may enable rig 101 to be easily oriented each time an image is captured. Further, as described in the above-referenced related applications, cameras 102 may be used to capture volumetric video and/or light-field volume data, permitting a view to be generated from any viewpoint within a viewing volume, as determined by the position and/or orientation of the viewer's head. Thus, camera system 200 may be used to facilitate video capture for virtual reality, augmented reality, and/or other interactive applications.

In at least one embodiment, video data and/or image data captured by rig 101 is transmitted directly to communications interface 109 of computing device 103, and such data is used in the manner described herein to manipulate live video. In another embodiment, video data and/or image data captured by rig 101 is stored at video data store 112, and used at a later time during post-processing operations.

In at least one embodiment, camera system 200 may be used to capture video data representing a scene via sequential capture of five wedge-shaped portions of the scene. As described in the above-referenced related applications, the five captured videos may be combined to generate a combined video depicting a 360° view of the scene. Capture of five wedge-shaped portions is merely exemplary; one skilled in the art will recognize that a camera system may be used to capture a scene divided into a different number of portions, which may not necessarily be wedge-shaped. A camera system used to capture a different number of wedges (for example, two, three, four, six, seven, or eight wedges) may have a different field-of-view, or may have the same field-of-view as camera system 200 depicted in FIG. 2.

Figure 3:
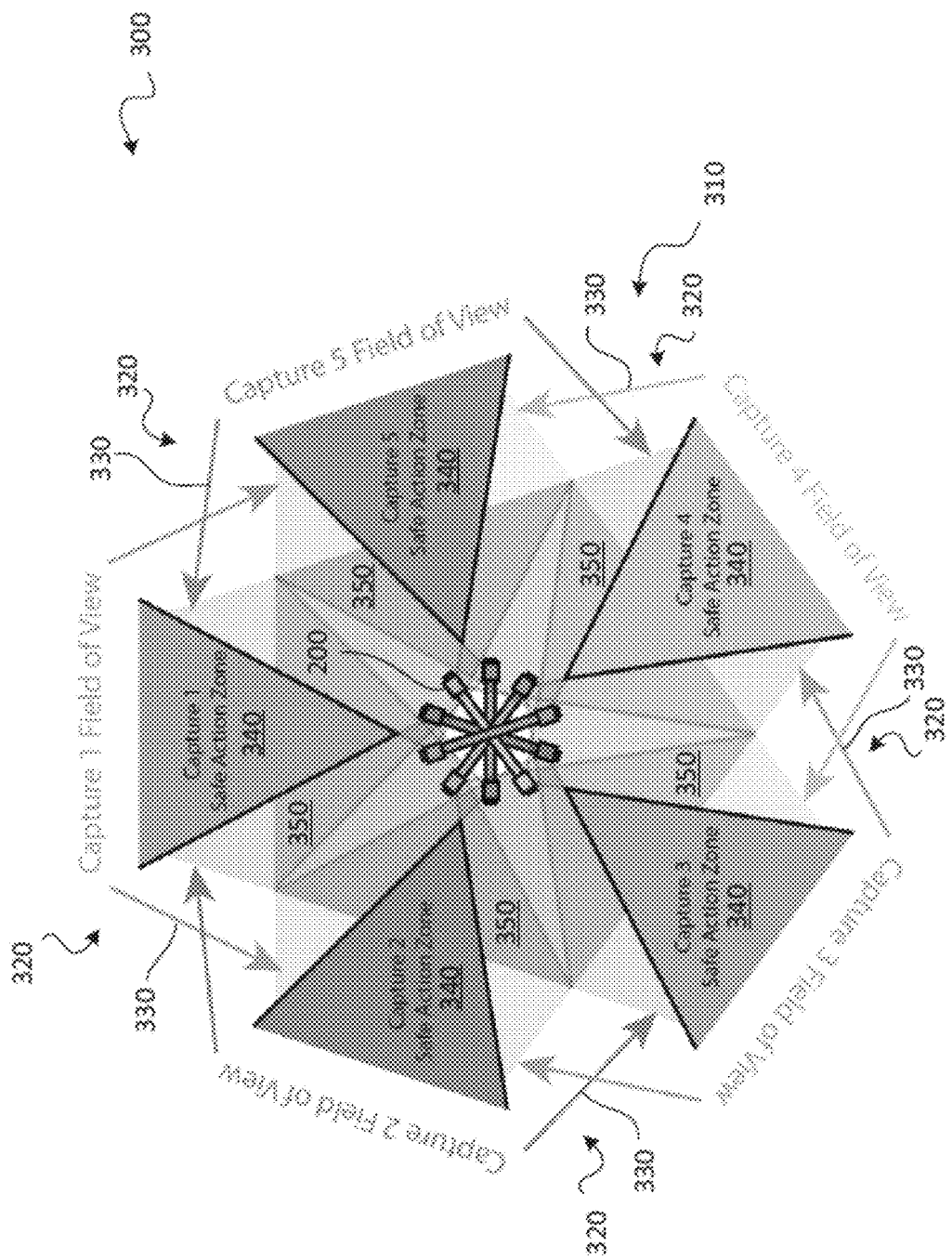
FIG. 3 is a diagram depicting the use of a camera system such as that of FIG. 2 to capture a 360° view of a scene in five wedge-shaped portions, according to one embodiment.

Referring now to FIG. 3, there is shown a diagram 300 depicting the use of camera system 200 such as that of FIG. 2 to capture a 360° view of a scene 310 in five wedge-shaped portions 320, according to one embodiment. As shown, each wedge-shaped portion 320 may have a field-of-view 330, which may include the fields-of-view of all of cameras 102 of camera system 200. Cameras 102 at the left and right points of the hexagonal shape of the planar array of cameras 102 may define the horizontal extents of field-of-view 330 for each wedge-shaped portion 320.

Further, each wedge-shaped portion 320 may have a safe action zone 340 that is a subset of field-of-view 330 for that wedge-shaped portion 320. In at least one embodiment, safe action zone 340 for a wedge-shaped portion 320 may be the portion of field-of-view 330 for that wedge-shaped portion 320 that is not included in field-of-view 330 of any other wedge-shaped portion 320. Outside of safe action zones 340, each field-of-view 330 may include two overlapping portions 350, each of which overlaps with field-of-view 330 of adjacent wedge-shaped portion 320.

In at least one embodiment, camera system 200 may be rotated sequentially so that it captures video for each wedge-shaped portion 320 in sequence. Thus, camera system 200 may first be oriented to capture field-of-view 330 labeled "Capture 1" Then, camera system 200 may be rotated such that camera system 200 is oriented to capture field-of-view 330 labeled "Capture 2," and then rotated in like manner to capture fields-of-view 330 labeled "Capture 3," "Capture 4," and "Capture 5." Such techniques are further described in the above-referenced related applications.

Method

Figure 4A:
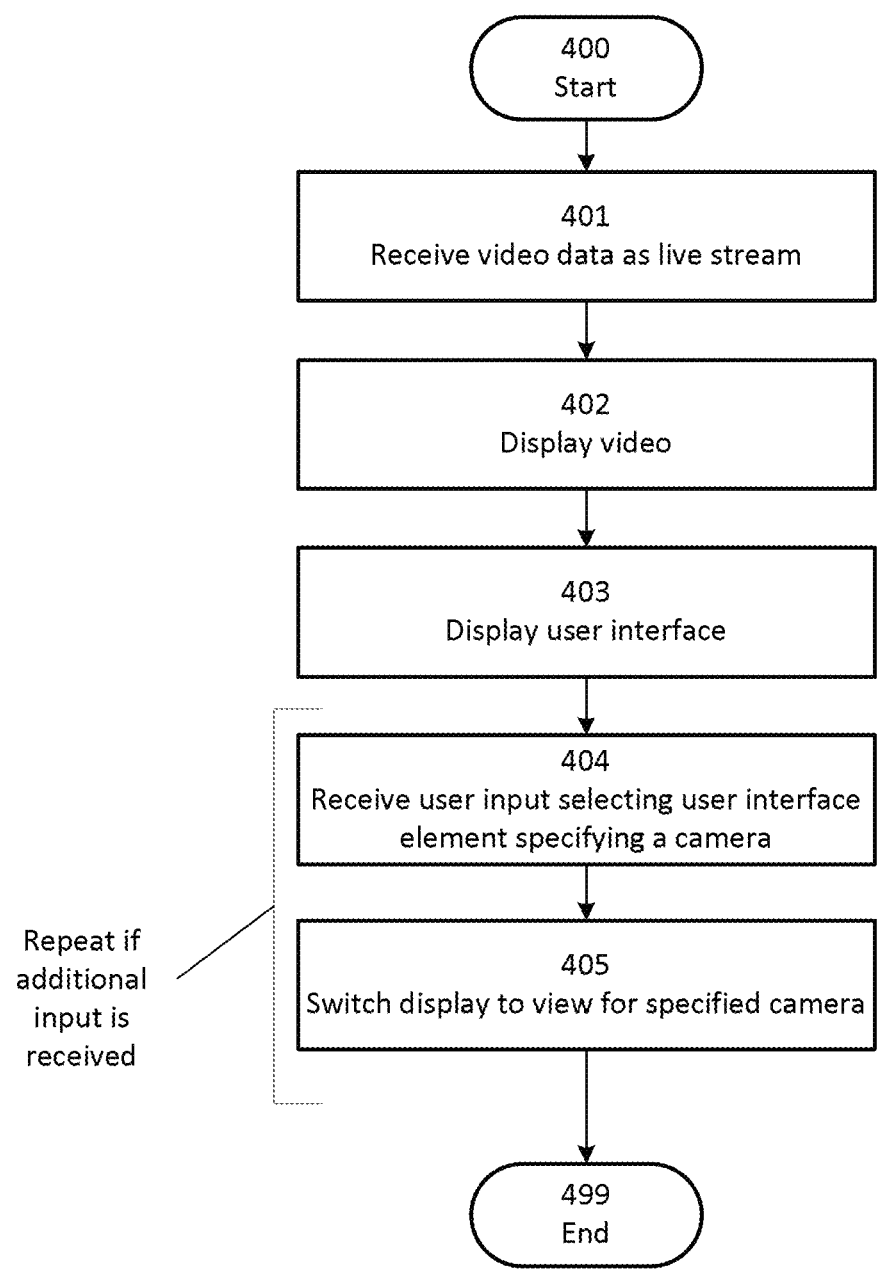
FIG. 4A is a flow chart depicting a method for implementing a user interface for navigating among different live camera views, according to one embodiment.

Referring now to FIG. 4A, there is shown a flow chart depicting a method for implementing a user interface for navigating among different live camera views, according to one embodiment. The method depicted in FIG. 4A can be used, for example, in connection with the architecture depicted in FIG. 1A or 1C, although one skilled in the art will recognize that the method can be used in connection with other architectures as well.

The method begins 400. Computing device 103 receives 401 video data in a live stream as it is captured by camera system 200; the live stream includes video data from all cameras 102. Video from one (or more) of cameras 102 is displayed 402, for example on output device 108. Concurrently, a user interface is displayed 403, to allow user 111 to control the displayed video. In at least one embodiment, the user interface is displayed 403 on the same output device 108 as is the video from one (or more) of cameras 102. As described in more detail below, the user interface can include user interface elements arranged in a manner that approximates the physical arrangement of cameras 102 within rig 101. Such user interface elements can include on-screen buttons, links, descriptive text, icons, images, thumbnails, live video, and/or any combination thereof.

User 111 can select 404 one of the displayed user interface elements, for example by tapping on it or clicking on it with an on-screen cursor. In at least one embodiment, this causes the display on output device 108 to switch 405 to a view of a camera 102 corresponding to the selected user interface element. In at least one embodiment, steps 404 and 405 can be repeated any number of types, allowing user 111 to repeatedly select different cameras 102 and see the video stream being captured from each selected camera 102. In at least one embodiment, additional controls can also be provided to allow user 111 to control and/or manipulate the currently selected camera 102, for example by changing its orientation and/or other parameters. In at least one embodiment, the sequence and timing of user's 111 selections of cameras 102 can be recorded, so as to provide an edit stream that can be used later in generating content.

Figure 4B:
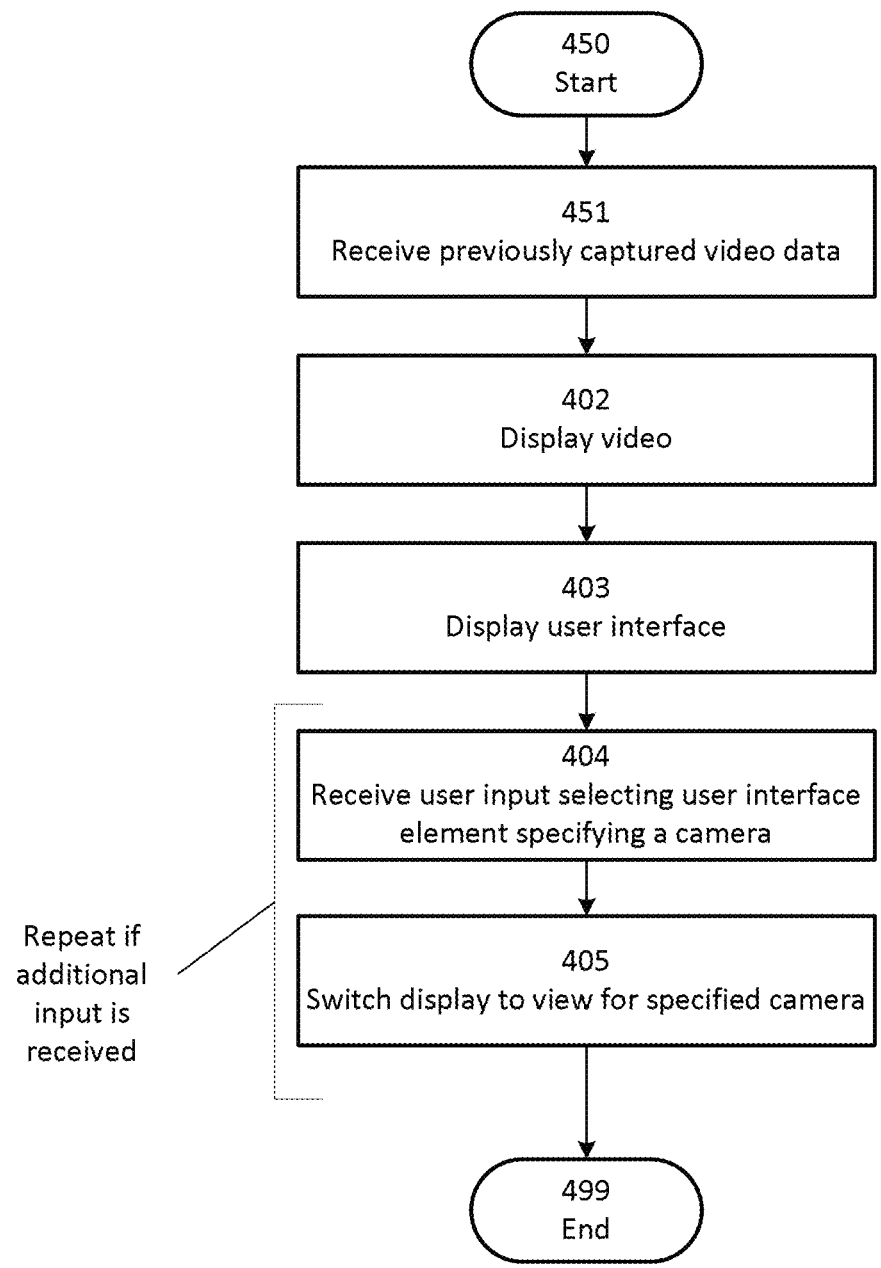
FIG. 4B is a flow chart depicting a method for implementing a user interface for navigating among stored video streams corresponding to different camera views, according to one embodiment.

Referring now to FIG. 4B, there is shown a flow chart depicting a method for implementing a user interface for navigating among stored video streams corresponding to different camera views, according to one embodiment. The method depicted in FIG. 4B can be used, for example, in connection with the architecture depicted in FIG. 1B to perform post-processing operations, although one skilled in the art will recognize that the method can be used in connection with other architectures as well.

The method begins 450. Computing device 103 receives 451 previously captured video data, for example from video data store 112; this can include video data from all cameras 102. Video from one (or more) of cameras 102 is displayed 402, for example on output device 108. Concurrently, a user interface is displayed 403, to allow user 111 to control the displayed video. In at least one embodiment, the user interface is displayed 403 on the same output device 108 as is the video from one (or more) of cameras 102. As described in more detail below, the user interface can include user interface elements arranged in a manner that approximates the physical arrangement of cameras 102 within rig 101. Such user interface elements can include on-screen buttons, links, descriptive text, icons, images, thumbnails, live video, and/or any combination thereof.

User 111 can select 404 one of the displayed user interface elements, for example by tapping on it, or clicking on it with an on-screen cursor. In at least one embodiment, this causes the display on output device 108 to switch 405 to a view that was previously captured by a camera 102 corresponding to the selected user interface element. In at least one embodiment, steps 404 and 405 can be repeated any number of types, allowing user 111 to repeatedly select different cameras 102 and see the video stream previously captured by each selected camera 102. In at least one embodiment, the sequence and timing of user's 111 selections of cameras 102 can be recorded, so as to provide an edit stream that can be used later in generating content.

In both the methods of FIGS. 4A and 4B, in at least one embodiment, user 111 can also perform other operations on the selected video stream, such as editing operations for generating content.

User Interface

Figure 5A:
FIGS. 5A through 5C depict examples of a user interface for displaying and navigating among different camera views, according to one embodiment.
Figure 5B:
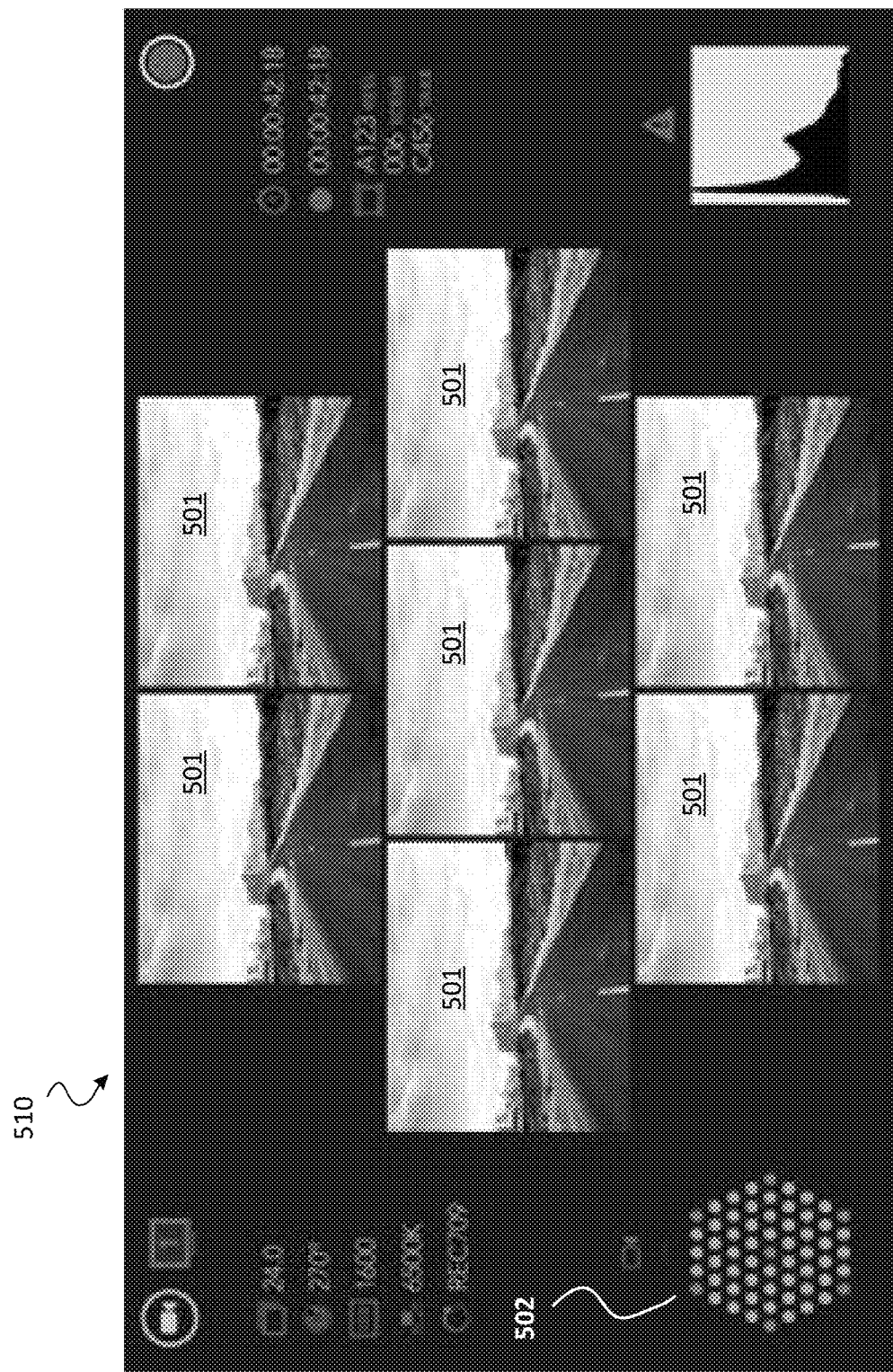
Figure 5C:
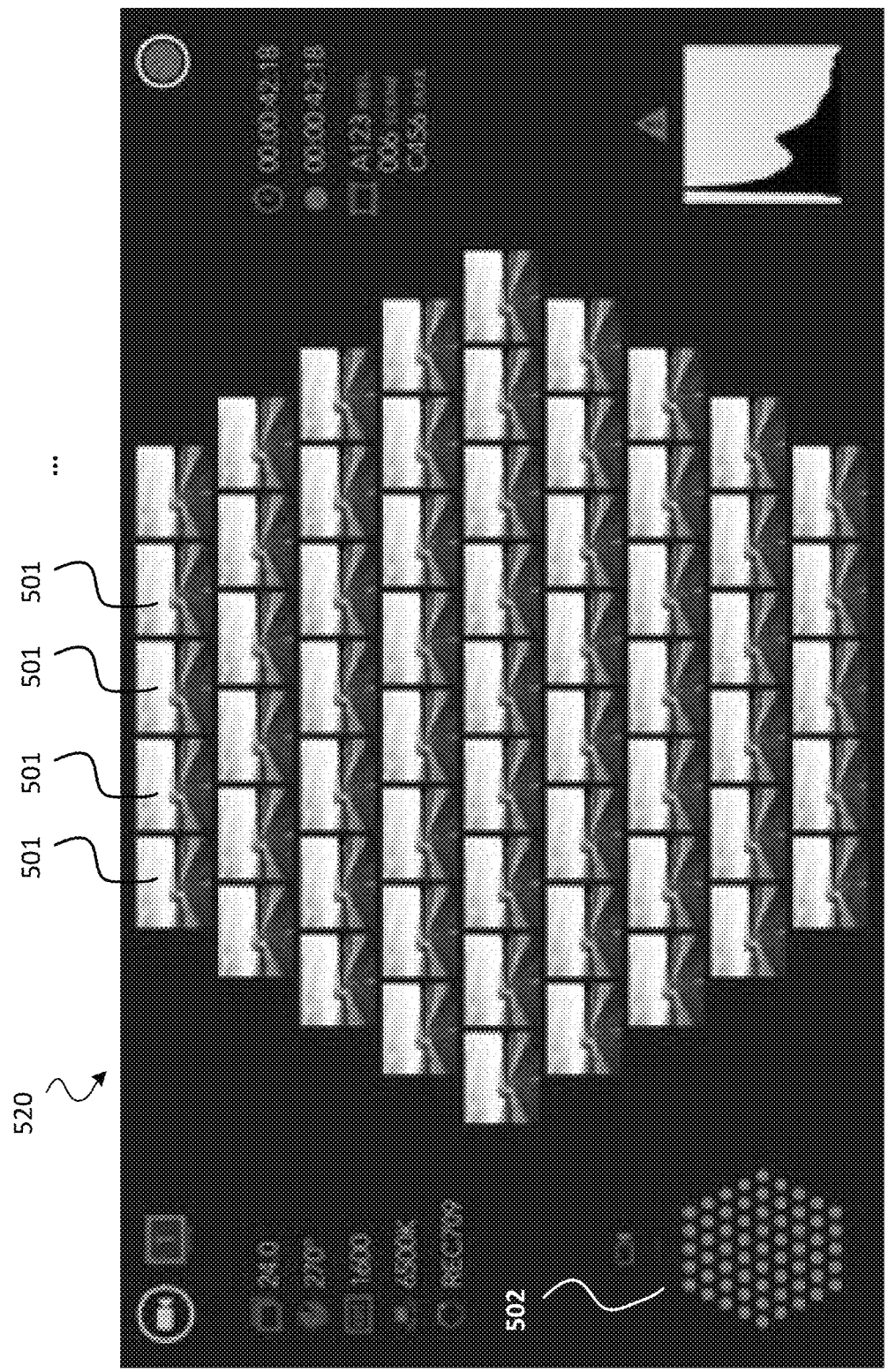

Referring now to FIGS. 5A through 5C, there are shown examples of a user interface for displaying and navigating among different camera views, according to various embodiments. The user interface depicted in these examples can be used in connection with either live views of video stream(s)

from cameras 102 within rig 101, or previously captured video data retrieved from video data store 112. In at least one embodiment, the user interface as depicted in these examples can be presented on output device 108, which may be part of camera system 200 (as in the architecture of FIG. 1C) or may be part of a separate computing device 103 (as in the architecture of FIG. 1A or 1B). As depicted in these examples, the user interface provides a way to display live (or recorded) camera views from any number of individual cameras 102 within rig 101, in an on-screen configuration that makes clear the physical arrangement of the individual cameras 102.

FIG. 5A depicts example 500, in which a single video stream is displayed in main video window 501. Rig schematic display 502 shows a representation of rig 101, wherein each dot in display 502 represents a camera 102. In this example, the dot corresponding to the camera view currently being shown in main video window 501 is shown in a different color than the other dots in display 502, making it easy for user 111 to determine which camera view is being presented. In at least one embodiment, user 111 can tap or click on dots within display 502 to cause corresponding camera views to be shown. In at least one embodiment, dots act as toggles, so that a user can tap or click again to remove a currently displayed view from the screen. In at least one embodiment video window(s) 501 automatically resize as video streams are added or removed, so as to make best use of available screen space while still displaying all activated videos.

FIG. 5B depicts example 510, in which seven video streams are concurrently displayed in seven different video windows 501. In at least one embodiment, as shown in example 510, video windows 501 are arranged on-screen in a manner that approximates the relative physical positions of the corresponding cameras 102 from which the video streams originate. Again, rig schematic display 502 shows a representation of rig 101, wherein each dot in display 502 represents a camera 102. Here, seven dots are shown in a distinct color to indicate which camera views are currently being presented. As before, in at least one embodiment, user 111 can tap or click on dots within display 502 to cause corresponding camera views to be shown.

FIG. 5C depicts example 520, in which video streams from all cameras 102 in rig 101 are concurrently displayed in 61 different video windows 501. In at least one embodiment, as shown in example 520, video windows 501 are arranged onscreen in a manner that approximates the relative physical positions of the corresponding cameras 102 from which the video streams originate. Again, rig schematic display 502 shows a representation of rig 101, wherein each dot in display 502 represents a camera 102. Here, all of the dots are shown in the distinct color to that all camera views are currently being presented. As before, in at least one embodiment, user 111 can tap or click on dots within display 502 to cause corresponding camera views to be shown.

In at least one embodiment, certain predefined view configurations of camera views can be made available. For example, user 111 can click a button or otherwise activate a command that causes only the view from center camera 102 to be displayed (as in example 500). As another example, user 111 can click a button or otherwise activate a command that causes the view from center camera 102 along with views from six corner cameras 102 to be displayed (as in example 510). As another example, user 111 can click a button or otherwise activate a command that causes the views from all cameras 102 to be displayed (as in example 520). Any number of such predefined view configurations of camera views can be provided. In at least one embodiment, user 111 can also edit or define his or her own view configurations, and/or manually select a view configuration.

Referring now to FIGS. 6A through 6D, there are shown various screens depicting an example 600 of a user interface for selecting a camera view, according to one embodiment. The depicted user interface can be used in connection with either live views of video stream(s) from cameras 102 within rig 101, or previously captured video data retrieved from video data store 112. In at least one embodiment, the depicted user interface can be presented on output device 108, which may be part of camera system 200 (as in the architecture of FIG. 1C) or may be part of a separate computing device 103 (as in the architecture of FIG. 1A or 1B). As depicted in this example, the user interface provides a way to select wedges and/or individual cameras 102 within rig 101, wherein the controls for performing such selections are presented in an on-screen configuration that maps to the physical arrangement of the cameras 102 themselves.

Wedge selection tool 601 provides a mechanism for user 111 to select among five wedge-shaped portions, also referred to as "wedges" (corresponding to wedge-shaped portions 320 of FIG. 3). Each wedge includes some subset of the total views taken by all cameras 102 within rig 101; for example, a wedge may be one of five different sequentially captured views of the scene that can be combined to form a 360° view of the scene, as described above in connection with FIGS. 2 and 3.

In at least one embodiment, wedge selection tool 601 includes five overlapping elongated rectangles 602, each representing a wedge. User 111 can select a wedge by tapping or clicking on one of rectangles 602. In other embodiments, other representations of wedges can be shown, with other mechanisms by which user 111 can select a wedge. Any number of wedges (or other subsets of views and/or cameras 102) can be provided, which can be selectable by user 111. Alternatively, the system can be implemented without any wedge selection tool 601 at all; in such a case, only the bottom portion of example 600 (containing camera selection tool 603) need be included. In the depicted example, user 111 has selected the wedge represented by rectangle 602A, which is currently highlighted.

Camera selection tool 603 includes a number of elements 604, each representing an individual camera 102. Each element 604 can be identified by a number, label, icon, thumbnail image, and/or any combination thereof. In at least one embodiment, camera selection tool 603 presents elements 604 that correspond to a subset of cameras 102 in rig 101, wherein the subset corresponds to the particular wedge selected via wedge selection tool 601. Thus, if user 111 selects a different wedge using wedge selection tool 601, a different set of elements 604 may be presented in camera selection tool 603; alternatively, the same set of elements 604 can be presented, but representing views taken from a different angle. In an alternative embodiment, camera selection tool 603 presents elements 604 that correspond to all views from all cameras 102 in rig 101, without any need to select a particular wedge or subset of views or cameras 102.

Notably, in at least one embodiment, elements 604 are positioned in an arrangement that approximates the physical arrangement of their corresponding cameras 102 in rig 101. This mapping between element positions 604 and physical camera positions makes it easier for user 111 to locate and select the correct element 604 for a particular desired camera 102.

In at least one embodiment, user 111 can tap or click on one or more elements 604 to select corresponding camera(s)

102. In at least one embodiment, live and/or recorded view(s) for the selected camera(s) 102 is/are displayed. In at least one embodiment, each element 604 acts as a toggle: tapping or clicking on it selects a corresponding camera 102 if it is currently unselected, or de-selects a corresponding camera 102 if it is currently selected. In the example of FIG. 6, the center element 604 (labeled "00000") is highlighted indicating that it is currently selected and that the view from its corresponding camera 102 is currently being displayed. In this example, the highlighted element 604 is indicated with a black background that contrasts with the background of other elements 604; however, one skilled in the art will recognize that any technique can be used to visually distinguish the highlighted element 604 from other elements 604.

Other user interface elements can also be provided. Some examples are shown in FIGS. 6A through 6D, as follows:

Drop-down menu 605 allows user 111 to select other rigs 101 to control, in an embodiment wherein multiple rigs 101 can be controlled by the same interface;

Find rigs button 606 reloads camera 102 positions and finds new nodes, which causes the list in menu 605 to be populated. Rig nodes are identified by the presence of Camera nodes placed within a Group node.

Figure 6A:
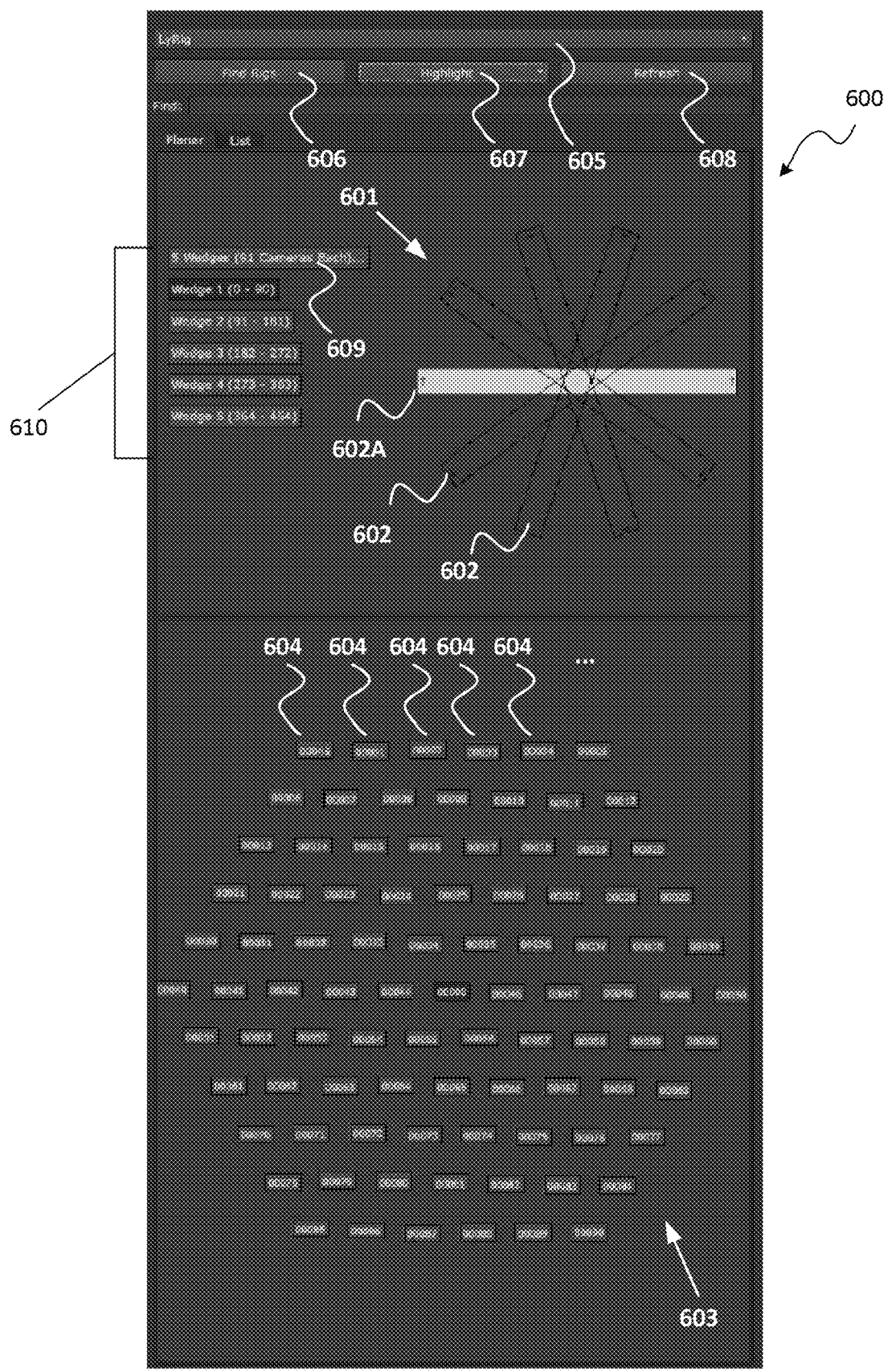
FIGS. 6A through 6D depict examples of a user interface for selecting a camera view, according to one embodiment.
Figure 6B:
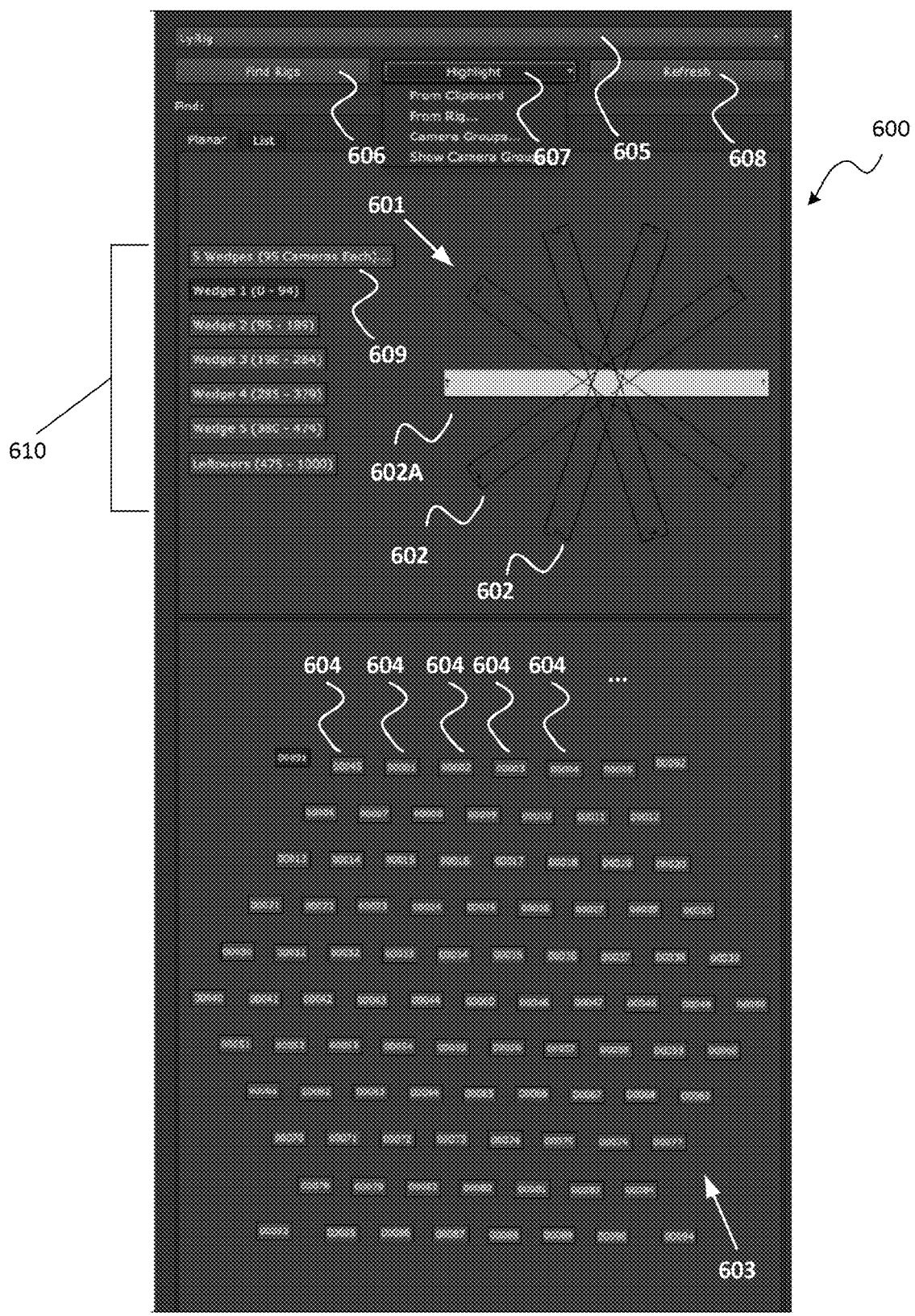
Figure 6C:
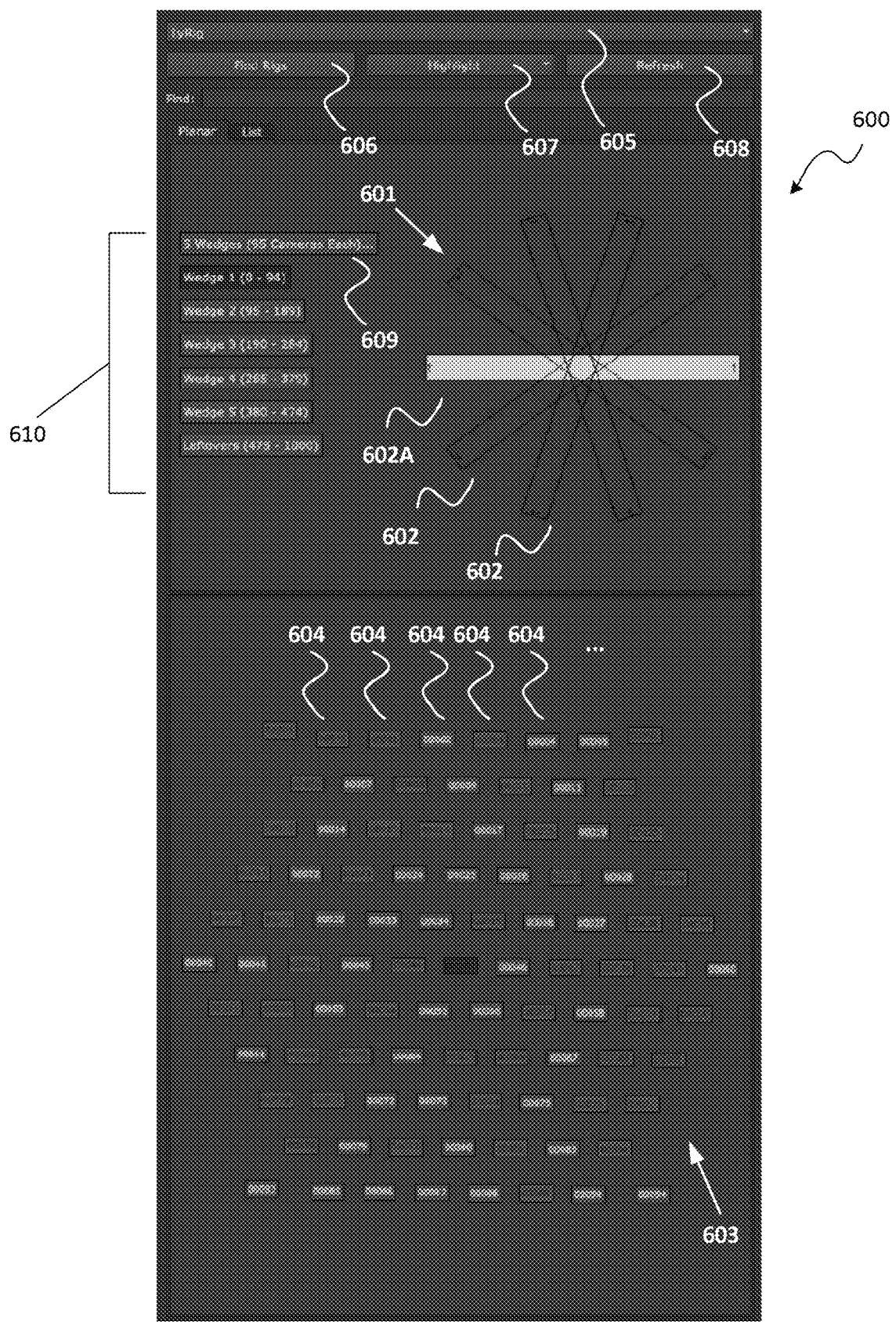
Figure 6D:
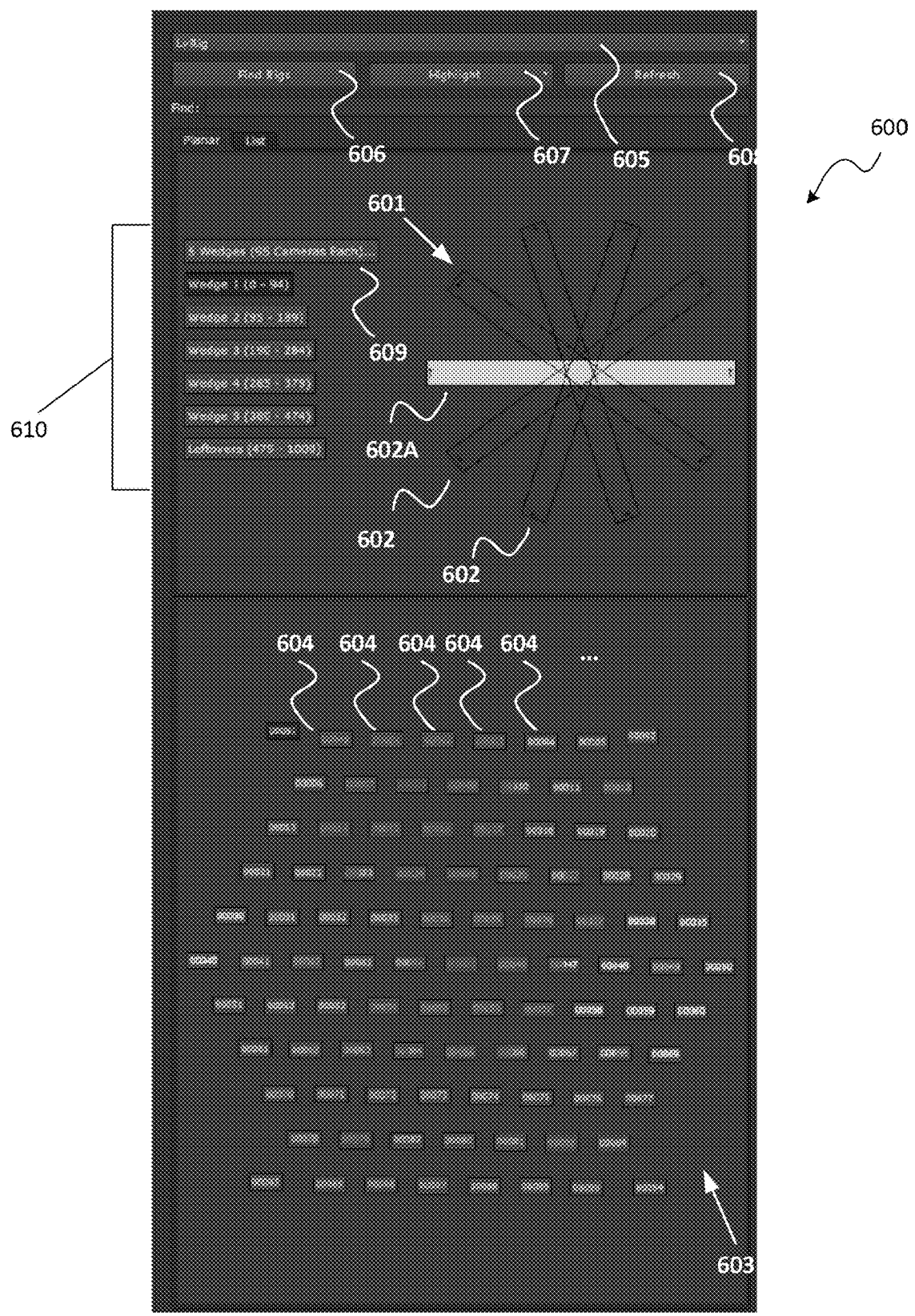

Highlight button 607 allows elements 604 to be highlighted using one of several modes, as shown in FIG. 6B. Elements 604 may be highlighted based on comma-delimited camera indexes stored in the clipboard. Elements 604 may also be highlighted based on another rig file, to show decimations, as shown in FIG. 6C, or colorized based on a particular group of cameras, as shown in FIG. 6D.

Refresh button 608 updates the currently highlighted element 604. This is necessary if the active view is changed using some means other than the camera selection interface.

Wedges button 609 includes a label that indicates the number of wedges and indicates the camera views included in each wedge. User 111 can click on button 609 to change these values.

Wedge selection buttons 610 provide an alternative mechanism for selecting a wedge. This performs the same operation as does wedge selection tool 601. Buttons 610 also indicate which cameras 102 are associated with each wedge.

Find box 611 allows a camera index to be entered, at which point the currently selected element is changed. If the element exists in a different wedge, the currently active wedge is also updated.

In at least one embodiment, keyboard shortcuts can be provided to navigate among camera views. Examples of keyboard shortcuts include:

Ctrl+Alt+R: Open a new panel for selecting a rig 101.
Ctrl+Shift+Up: Move to the next closest view above the current view.
Ctrl+Shift+Down: Move to the next closest view below the current view.
Ctrl+Shift+Left: Move to the next closest view to the left of the current view.
Ctrl+Shift+Right: Move to the next closest view to the right of the current view.
Ctrl+Shift+PageUp: Move to the next wedge.
Ctrl+Shift+PageDown: Move to the previous wedge.
Ctrl+Shift+Home: Move to the center view in the current wedge.
Ctrl+Shift+End: Move to the last selected view. This can be used to toggle between two views.
Ctrl+Shift+/: Activate and move cursor to Find box 611.

Referring now to FIGS. 7A through 7E, there are shown additional examples of a user interface for navigating among different camera views, according to various embodiments.

Figure 7A:
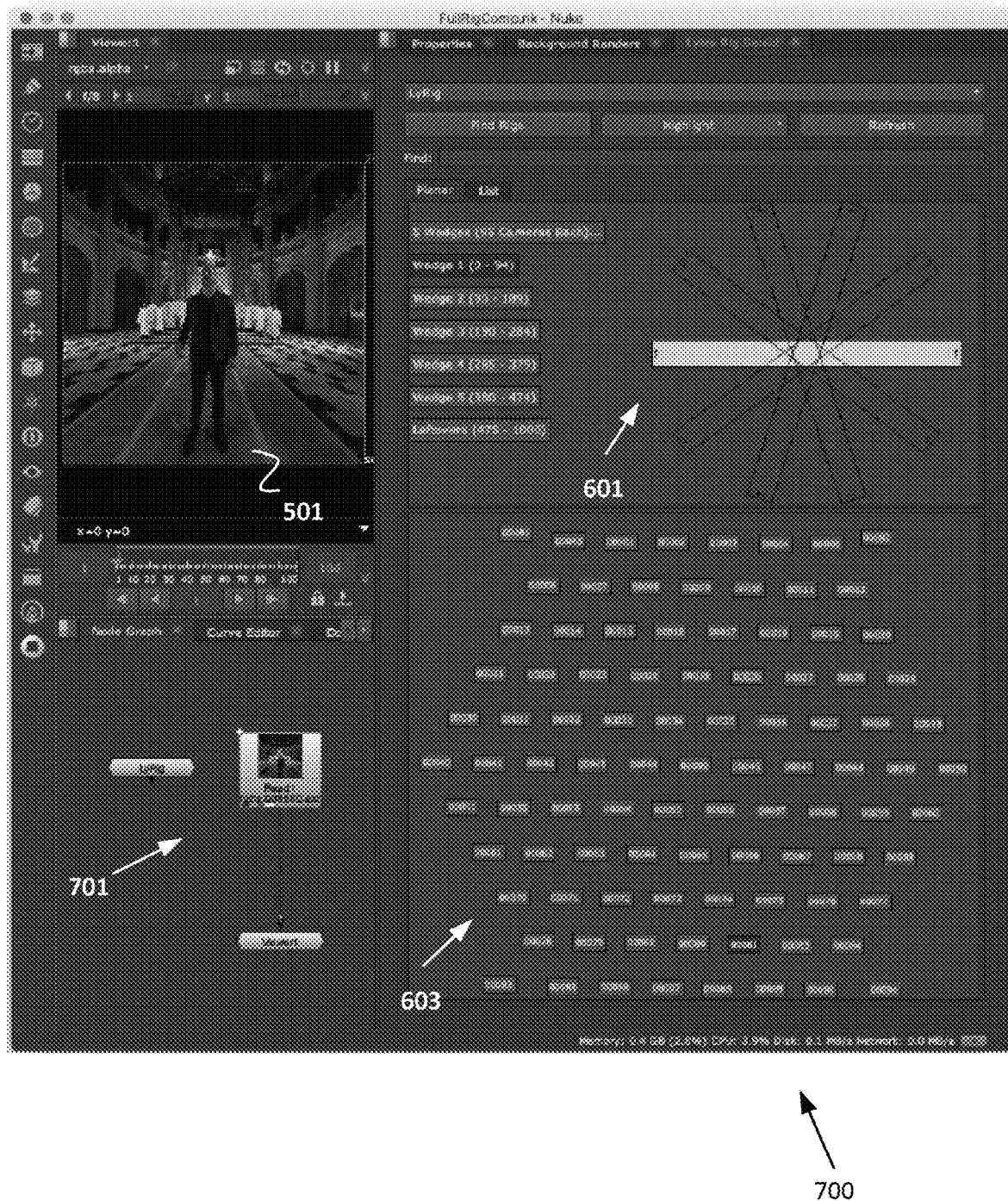
FIGS. 7A through 7E depict additional examples of a user interface for navigating among different camera views, according to various embodiments.

FIG. 7A depicts example 700. In this example, user 111 has used wedge selection tool 601 to select wedge 1, and has used camera selection tool 603 to select the camera labeled "00081". Main video window 501 displays video captured by the camera labeled "00081". Also included in example 700 is node graph 701, which depicts a sample Read node and camera rig node.

Figure 7B:
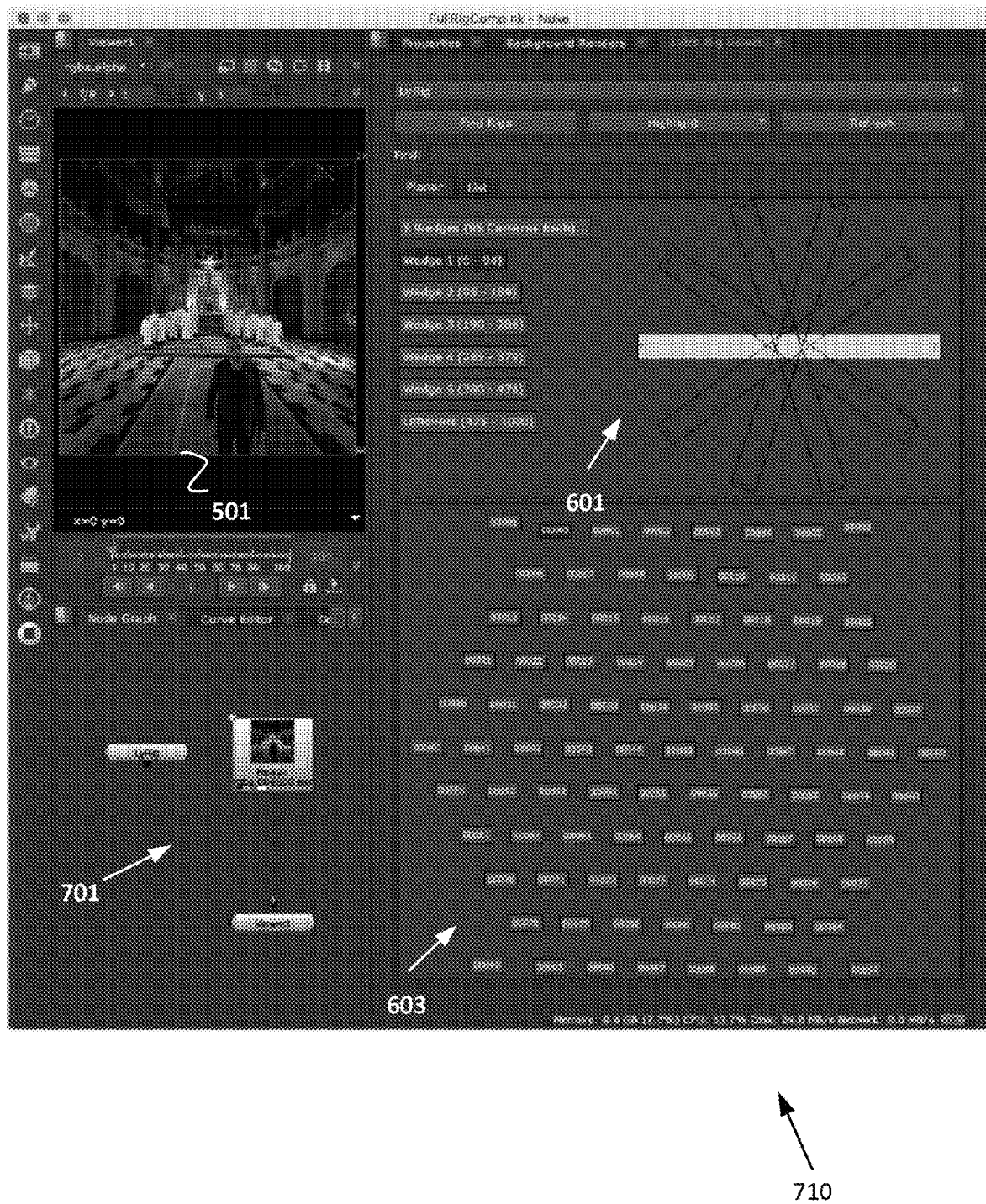

FIG. 7B depicts example 710. In this example, user 111 has used wedge selection tool 601 to select wedge 1, and has used camera selection tool 603 to select the camera labeled "00045". Main video window 501 displays video captured by the camera labeled "00045". Also included in example 710 is node graph 701.

Figure 7C:
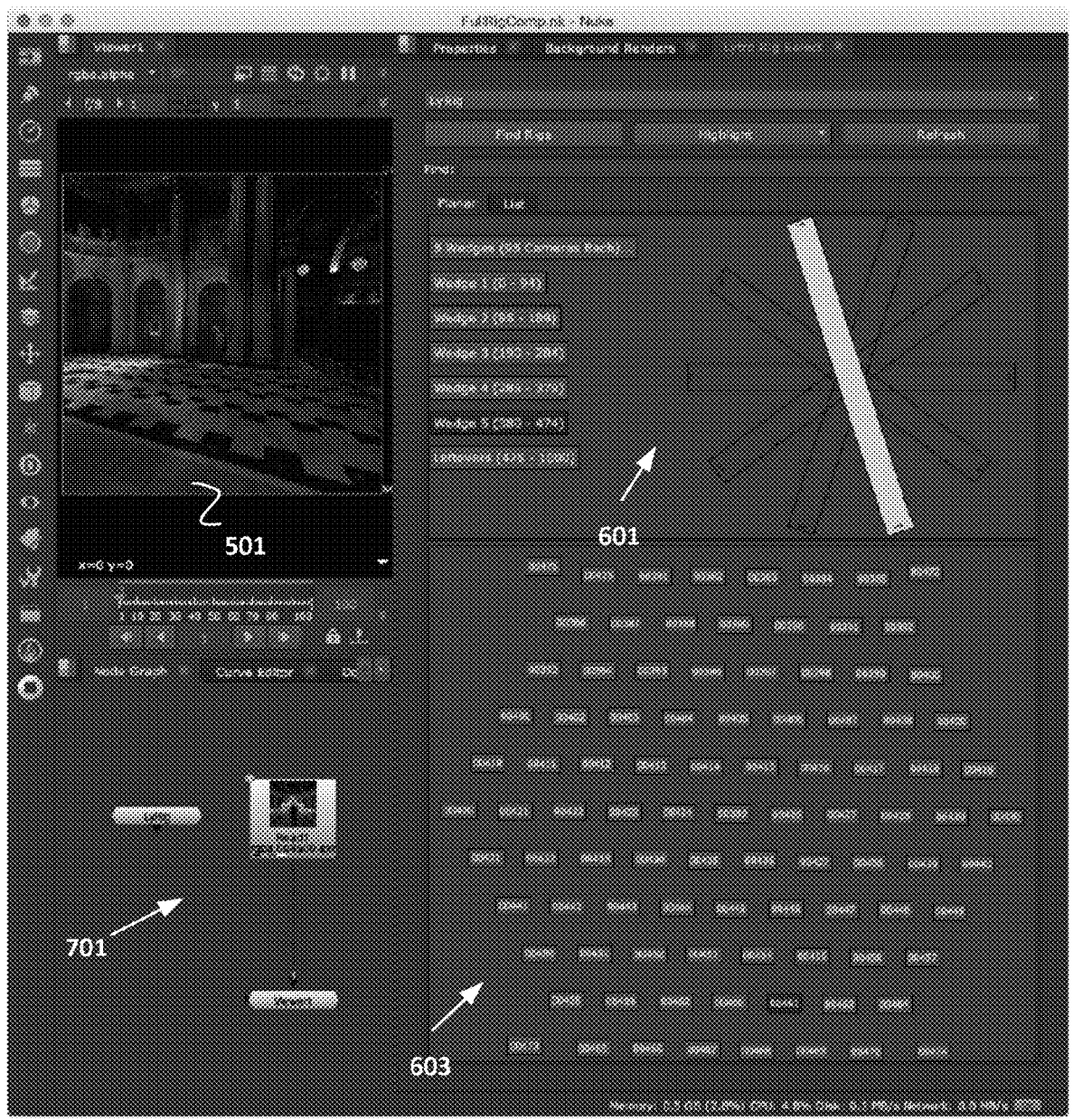

FIG. 7C depicts example 720. In this example, user 111 is in the process of using wedge selection tool 601 to select wedge 5, and has used camera selection tool 603 to select the camera labeled "00461". Main video window 501 displays video captured by the camera labeled "00461". Also included in example 720 is node graph 701.

Figure 7D:
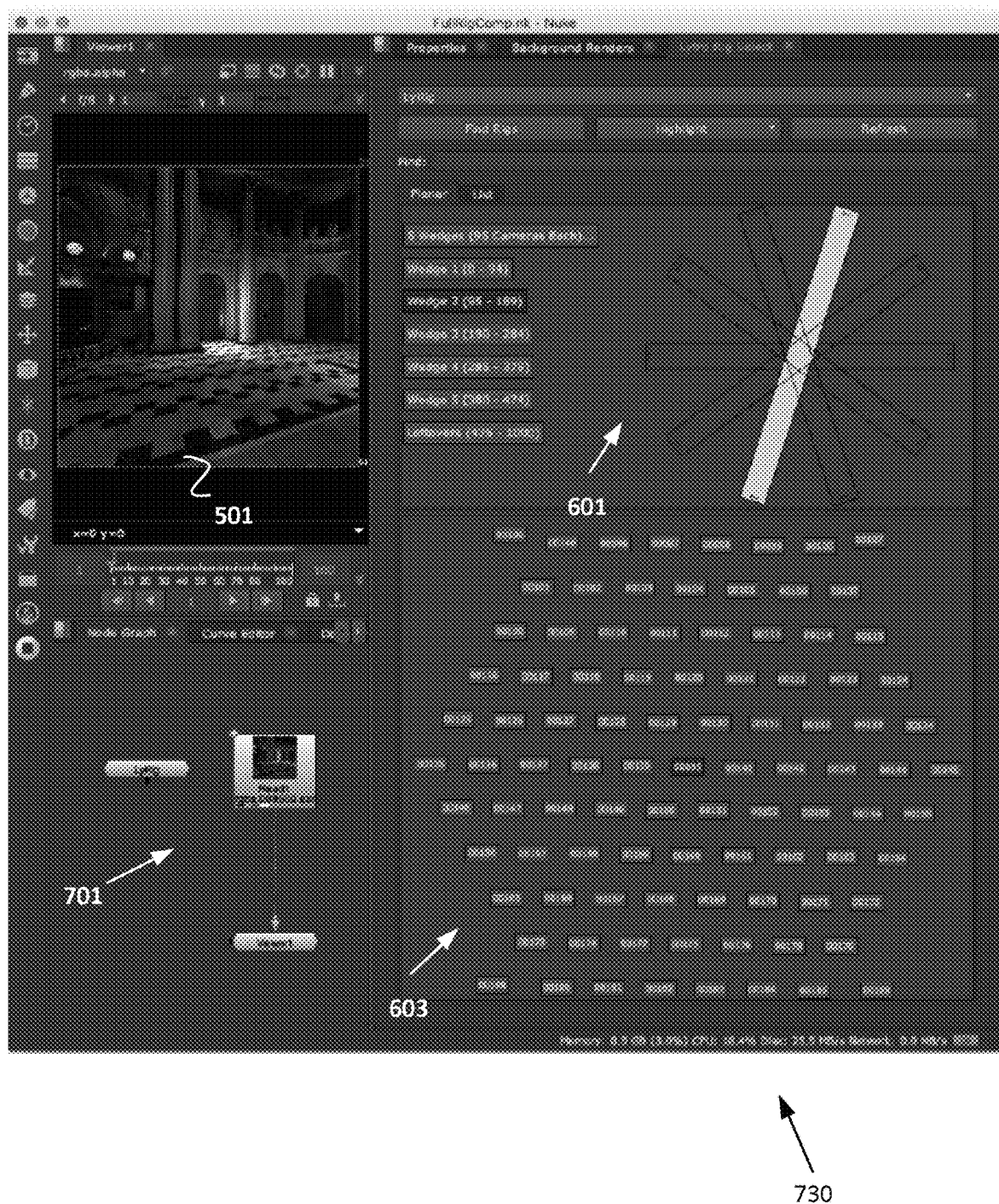

FIG. 7D depicts example 730. In this example, user 111 has used wedge selection tool 601 to select wedge 2, and has used camera selection tool 603 to select the camera labeled "00095". Main video window 501 displays video captured by the camera labeled "00095". Also included in example 730 is node graph 701.

Figure 7E:
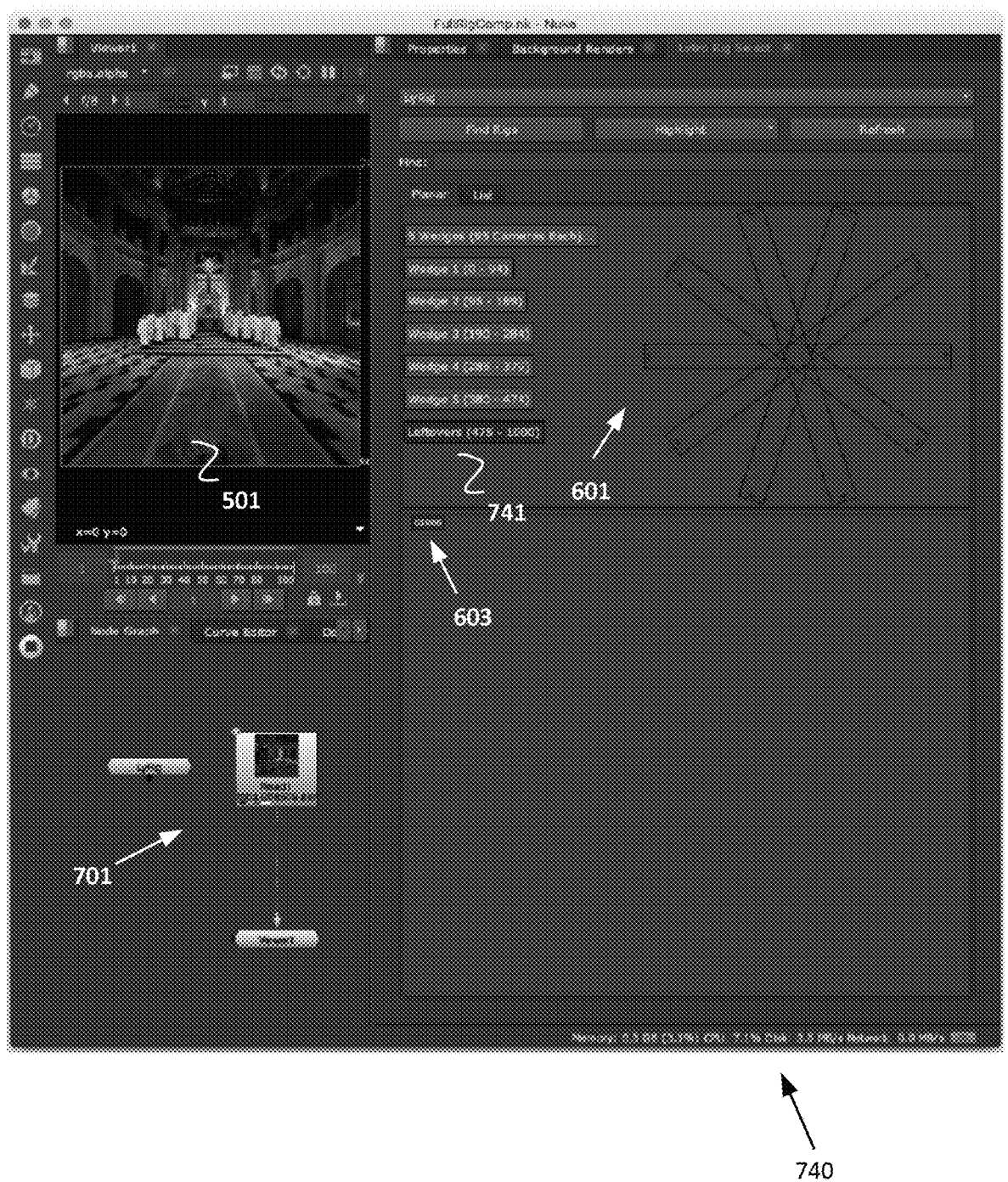

FIG. 7E depicts example 740. In this example, user 111 has used wedge selection tool 601 to select the cameras not in any wedge, denoted by "Leftovers" 741, and has used camera selection tool 603 (which in this case only includes one camera selection button) to select the camera labeled "01000". Main video window 501 displays video captured by the currently selected camera labeled "01000". Also included in example 740 is node graph 701.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A multi-camera navigation interface, comprising:
a communication interface, configured to receive video signals from a plurality of cameras arranged according to a physical layout;
a first display area, configured to display a user interface comprising a plurality of visual elements representing the cameras, the visual elements being arranged according to a layout approximating the physical layout of the cameras;
a user input device, configured to receive user input selecting a first one of the visual elements;
a second display area, configured to display a first video signal from a first camera corresponding to the first visual element; and
a wedge selection tool that includes a plurality of over-lapping elongated rectangles arranged such that centers of the plurality of over-lapping elongated rectangles overlap angularly at a midpoint of each over-lapping elongated rectangle, the wedge selection tool being configured to allow for a selection of a wedge of a plurality of wedges associated with the plurality of cameras in the first display area, each wedge being represented as an elongated rectangle of the plurality of over-lapping elongated rectangles.

2. The multi-camera navigation interface of claim 1, wherein the plurality of visual elements representing the cameras comprises a plurality of thumbnail video streams comprising images from the received video signals.

3. The multi-camera navigation interface of claim 2, wherein each thumbnail video stream comprises a live view from one of the cameras.

4. The multi-camera navigation interface of claim 3, further comprising a control device, configured to:
receive additional user input to control the first camera; and
transmit a signal to control operation of the first camera in response to the received additional user input.

5. The multi-camera navigation interface of claim 2, wherein each thumbnail video stream comprises a recorded video stream from one of the cameras.

6. The multi-camera navigation interface of claim 2, further comprising:
video processing circuitry, communicatively coupled to the communication interface, configured to generate a composite video stream comprising the images from the received video signals;
wherein the displayed plurality of visual elements representing the cameras comprises the composite video stream.

7. The multi-camera navigation interface of claim 1, further comprising:
a display device;
wherein:
the first display area and the second display area are presented on the same display device.

8. The multi-camera navigation interface of claim 1, further comprising:
a first display device; and
a second display device;
wherein:
the first display area is presented on the first display device; and
the second display area is presented on the second display device.

9. The multi-camera navigation interface of claim 1, wherein:
the user input device is further configured to receive additional user input selecting a second one of the visual elements, wherein the additional user input is received while the second display area is dis-playing the first video signal; and
the second display area is further configured to, responsive to the user input device receiving the additional user input, switch to displaying a second video signal from a second camera corresponding to the second visual element.

10. The multi-camera navigation interface of claim 1, wherein the plurality of cameras comprise a camera rig.

11. The multi-camera navigation interface of claim 10, wherein the camera rig comprises a planar camera rig.

12. The multi-camera navigation interface of claim 1, wherein the plurality of cameras is configured to capture light-field video.

13. The multi-camera navigation interface of claim 1, wherein the received video signals represent video for a virtual reality experience.

14. The multi-camera navigation interface of claim 1, wherein the received video signals represent video for an augmented reality experience.

15. The multi-camera navigation interface of claim 1, wherein:
each wedge comprises a subset of the cameras;
and wherein the user input device is configured to:
receive first user input selecting one of the wedges; and
receive second user input selecting one of the cameras within the selected wedge.

16. The multi-camera navigation interface of claim 1, wherein:
the user input device comprises a touch screen;
and wherein the user input comprises a user touching the touch screen at a location corresponding to the display of one of the visual elements.

17. The multi-camera navigation interface of claim 1, wherein:
the user input device comprises a pointing device;
and wherein the user input comprises a user using the pointing device to move a cursor to a location corresponding to the display of one of the visual elements.

18. The multi-camera navigation interface of claim 1, wherein the received video signals represent different views of a common scene.

19. A method for providing a multi-camera navigation interface, comprising:
receiving, via a communication interface, video signals from a plurality of cameras arranged according to a physical layout;
in a first display area, displaying a user interface comprising a plurality of visual elements representing the cameras, the visual elements being arranged according to a layout approximating the physical layout of the cameras;
at a user input device, receiving user input selecting a first one of the visual elements; and
in a second display area, displaying a first video signal from a first camera corresponding to the first visual element, wherein a wedge selection tool is configured to allow a user to select a wedge of a plurality of wedges and the plurality of cameras associated with the plurality of wedges; by tapping or clicking on the wedge.

20. The method of claim 19, wherein the plurality of visual elements representing the cameras comprises a plurality of thumbnail video streams comprising images from the received video signals.

21. The method of claim 20, wherein each thumbnail video stream comprises a live view from one of the cameras.

22. The method of claim 21, further comprising:
at the user input device, receiving additional user input to control the first camera; and
transmitting a signal to control operation of the first camera in response to the received additional user input.

23. The method of claim 20, wherein each thumbnail video stream comprises a recorded video stream from one of the cameras.

24. The method of claim 20, further comprising:
using video processing circuitry, generating a composite video stream comprising the images from the received video signals;
wherein the displayed plurality of visual elements representing the cameras comprises the composite video stream.

25. The method of claim 19, wherein the first display area and the second display area are presented on the same display device.

26. The method of claim 19, wherein the first display area is presented on a first display device and the second display area is presented on a second display device.

27. The method of claim 19, further comprising:
at the user input device, receiving additional user input selecting a second one of the visual elements, wherein the additional user input is received while the second display area is displaying the first video signal; and
responsive to receiving the additional user input, in the second display area, displaying a second video signal from a second camera corresponding to the second visual element.

28. The method of claim 19, wherein the plurality of cameras comprise a camera rig.

29. The method of claim 28, wherein the camera rig comprises a planar camera rig.

30. The method of claim 19, wherein the plurality of cameras is configured to capture light-field video.

31. The method of claim 19, wherein the received video signals represent video for a virtual reality experience.

32. The method of claim 19, wherein the received video signals represent video for an augmented reality experience.

33. The method of claim 19, wherein:
each wedge comprises a subset of the cameras;
and wherein receiving the user input selecting a first one of the visual elements comprises:
receiving first user input selecting one of the wedges; and
receiving second user input selecting one of the cameras within the selected wedge.

34. The method of claim 19, wherein:
the user input device comprises a touch screen; and
receiving the user input selecting a first one of the visual elements comprises detecting user contact with the touch screen at a location corresponding to the display of one of the visual elements.

35. The method of claim 19, wherein:
the user input device comprises a pointing device controlling a cursor; and
receiving the user input selecting a first one of the visual elements comprises detecting the cursor being positioned at a location corresponding to the display of one of the visual elements.

36. The method of claim 19, wherein the received video signals represent different views of a common scene.

37. A non-transitory computer-readable medium for providing a multi-camera navigation interface, comprising instructions stored thereon, that when executed by one or more processors, perform the steps of:
receiving, via a communication interface, video signals from a plurality of cameras arranged according to a physical layout;
causing a display device to display, in a first display area, a user interface comprising a plurality of visual elements representing the cameras, the visual elements being arranged according to a layout approximating the physical layout of the cameras;
causing a user input device to receive user input selecting a first one of the visual elements; and
causing the display device to display, in a second display area, a first video signal from a first camera corresponding to the first visual element, wherein a wedge selection tool includes a plurality of over-lapping elongated rectangles arranged such that centers overlap the plurality of over-lapping elongated rectangles angularly at a midpoint of each over-lapping elongated rectangle, the wedge selection tool being configured to allow for a selection of a wedge of a plurality of wedges associated with the plurality of cameras in the first display area, each wedge being represented as an elongated rectangle.

38. The non-transitory computer-readable medium of claim 37, wherein the plurality of visual elements representing the cameras comprises a plurality of thumbnail video streams comprising images from the received video signals.

39. The non-transitory computer-readable medium of claim 38, wherein each thumbnail video stream comprises a live view from one of the cameras.

40. The non-transitory computer-readable medium of claim 39, further comprising instructions that, when executed by one or more processors, perform the steps of:
causing the user input device to receive additional user input to control the first camera; and
transmitting a signal to control operation of the first camera in response to the received additional user input.

41. The non-transitory computer-readable medium of claim 38, wherein each thumbnail video stream comprises a recorded video stream from one of the cameras.

42. The non-transitory computer-readable medium of claim 38, further comprising instructions that, when executed by one or more processors, perform the steps of:
using video processing circuitry, generating a composite video stream comprising the images from the received video signals;
wherein the displayed plurality of visual elements representing the cameras comprises the composite video stream.

43. The non-transitory computer-readable medium of claim 37, wherein the first display area and the second display area are presented on the same display device.

44. The non-transitory computer-readable medium of claim 37, wherein the first display area is presented on a first display device and the second display area is presented on a second display device.

45. The non-transitory computer-readable medium of claim 37, further comprising instructions that, when executed by one or more processors, perform the steps of:
- causing the user input device to receive additional user input selecting a second one of the visual elements, wherein the additional user input is received while the second display area is displaying the first video signal; and
- responsive to receiving the additional user input, causing the display device to display, in the second display area, a second video signal from a second camera corresponding to the second visual element.

46. The non-transitory computer-readable medium of claim 37, wherein the plurality of cameras comprise a camera rig.

47. The non-transitory computer-readable medium of claim 46, wherein the camera rig comprises a planar camera rig.

48. The non-transitory computer-readable medium of claim 37, wherein the plurality of cameras is configured to capture light-field video.

49. The non-transitory computer-readable medium of claim 37, wherein the received video signals represent video for a virtual reality experience.

50. The non-transitory computer-readable medium of claim 37, wherein the received video signals represent video for an augmented reality experience.

51. The non-transitory computer-readable medium of claim 37, wherein:
- each wedge comprises a subset of the cameras;
- and wherein receiving the user input selecting a first one of the visual elements comprises:
- receiving first user input selecting one of the wedges; and
- receiving second user input selecting one of the cameras within the selected wedge.

52. The non-transitory computer-readable medium of claim 37, wherein:
- the user input device comprises a touch screen; and
- receiving the user input selecting a first one of the visual elements comprises detecting user contact with the touch screen at a location corresponding to the display of one of the visual elements.

53. The non-transitory computer-readable medium of claim 37, wherein:
- the user input device comprises a pointing device controlling a cursor; and
- receiving the user input selecting a first one of the visual elements comprises detecting the cursor being positioned at a location corresponding to the display of one of the visual elements.

54. The non-transitory computer-readable medium of claim 37, wherein the received video signals represent different views of a common scene.

* * * * *

UNITED STATES PATENT AND TRADEMARK OFFICE
CERTIFICATE OF CORRECTION

PATENT NO. : 10,965,862 B2
APPLICATION NO. : 15/874723
DATED : March 30, 2021
INVENTOR(S) : Mark Weir and Grant Yoshida It is certified that error appears in the above-identified patent and that said Letters Patent is hereby corrected as shown below:

In the Claims

At Column 16 Line 8, please replace "dis-playing" with "displaying"

Signed and Sealed this
Seventh Day of March, 2023

Katherine Kelly Vidal
*Director of the United States Patent and Trademark Office*